(12) United States Patent
Ding et al.

(10) Patent No.: US 12,495,989 B2
(45) Date of Patent: Dec. 16, 2025

(54) MEASURING GAIT TO DETECT IMPAIRMENT

(71) Applicant: ORACLE INTERNATIONAL CORPORATION, Redwood Shores, CA (US)

(72) Inventors: Zejin Ding, Atlanta, GA (US); Matthew T. Gerdes, Oakland, CA (US); Guang Chao Wang, San Diego, CA (US); Kenny C. Gross, Escondido, CA (US); Andrew Vakhutinsky, Sharon, MA (US)

(73) Assignee: Oracle International Corporation, Redwood Shores, CA (US)

( * ) Notice: Subject to any disclaimer, the term of this patent is extended or adjusted under 35 U.S.C. 154(b) by 349 days.

(21) Appl. No.: 18/085,974

(22) Filed: Dec. 21, 2022

(65) Prior Publication Data
US 2024/0206766 A1    Jun. 27, 2024

(51) Int. Cl.
*A61B 5/11*    (2006.01)
*A61B 5/00*    (2006.01)
*G01P 15/18*    (2013.01)

(52) U.S. Cl.
CPC ............ *A61B 5/112* (2013.01); *A61B 5/1126* (2013.01); *A61B 5/7203* (2013.01); *A61B 5/746* (2013.01);
(Continued)

(58) Field of Classification Search
CPC ..... A61B 5/112; A61B 5/1126; A61B 5/7203; A61B 5/746; A61B 2562/0219; G01P 15/18
See application file for complete search history.

(56) References Cited

U.S. PATENT DOCUMENTS 3,705,516 A    12/1972 Reis
4,635,058 A    1/1987 Sutphin
(Continued)

FOREIGN PATENT DOCUMENTS

CN    107181543 A1    9/2017
CN    110941020 A1    3/2020
(Continued)

OTHER PUBLICATIONS

Patent Cooperation Treaty (PCT), International Search Report and Written Opinion issued in PCT International Application No. PCT/US2021/015802 having a date of mailing of May 28, 2021 (13 pgs).
(Continued)

*Primary Examiner* — Michael J Dalbo
(74) *Attorney, Agent, or Firm* — Kraguljac Law Group LLC

(57) ABSTRACT

Systems, methods, and other embodiments associated with detecting impairment using a vibration fingerprint that characterizes gait dynamics are described. An example method includes receiving measurements of a gait of a being from a sensor. The measurements of the gait are converted into a time series of observations for each frequency bin in a set of frequency bins. A time series of residuals is generated for each range of the set by pointwise subtraction between the time series of observations and a time series of references for each range of the set. An impairment metric is generated based on the time series of residuals. The impairment metric is compared to a threshold for the impairment. In response to the impairment metric satisfying the threshold, the being is indicated to be impaired.

20 Claims, 11 Drawing Sheets

(52) U.S. Cl.
CPC ...... *A61B 2562/0219* (2013.01); *G01P 15/18* (2013.01)

(56) References Cited

U.S. PATENT DOCUMENTS

| | | | |
|---|---|---|---|
| 4,686,655 | A | 8/1987 | Hyatt |
| 5,619,616 | A | 4/1997 | Brady et al. |
| 7,020,802 | B2 | 3/2006 | Gross et al. |
| 7,191,096 | B1 | 3/2007 | Gross et al. |
| 7,281,112 | B1 | 10/2007 | Gross et al. |
| 7,292,659 | B1 | 11/2007 | Gross et al. |
| 7,391,835 | B1 | 6/2008 | Gross et al. |
| 7,542,995 | B2 | 6/2009 | Thampy et al. |
| 7,573,952 | B1 | 8/2009 | Thampy et al. |
| 7,613,576 | B2 | 11/2009 | Gross et al. |
| 7,613,580 | B2 | 11/2009 | Gross et al. |
| 7,702,485 | B2 | 4/2010 | Gross et al. |
| 7,869,977 | B2 | 1/2011 | Lewis et al. |
| 8,055,594 | B2 | 11/2011 | Dhanekula et al. |
| 8,069,490 | B2 | 11/2011 | Gross et al. |
| 8,150,655 | B2 | 4/2012 | Dhanekula et al. |
| 8,200,991 | B2 | 6/2012 | Vaidyanathan et al. |
| 8,214,682 | B2 | 7/2012 | Madyanathan et al. |
| 8,275,738 | B2 | 9/2012 | Gross et al. |
| 8,341,759 | B2 | 12/2012 | Gross et al. |
| 8,365,003 | B2 | 1/2013 | Gross et al. |
| 8,452,586 | B2 | 5/2013 | Master et al. |
| 8,457,913 | B2 | 6/2013 | Zwinger et al. |
| 8,543,346 | B2 | 9/2013 | Gross et al. |
| 8,983,677 | B2 | 3/2015 | Wright et al. |
| 9,093,120 | B2 | 7/2015 | Bilobrov |
| 9,514,213 | B2 | 12/2016 | Wood et al. |
| 9,911,336 | B2 | 3/2018 | Schlechter et al. |
| 9,933,338 | B2 | 4/2018 | Noda et al. |
| 10,015,139 | B2 | 7/2018 | Gross et al. |
| 10,452,510 | B2 | 10/2019 | Gross et al. |
| 10,496,084 | B2 | 12/2019 | Li et al. |
| 10,860,011 | B2 | 12/2020 | Gross et al. |
| 10,929,776 | B2 | 2/2021 | Gross et al. |
| 11,042,428 | B2 | 6/2021 | Gross et al. |
| 11,055,396 | B2 | 7/2021 | Gross et al. |
| 11,096,625 | B2* | 8/2021 | Kumar ............. A61B 5/6898 |
| 11,255,894 | B2 | 2/2022 | Wetherbee et al. |
| 11,392,786 | B2 | 7/2022 | Gross et al. |
| 2001/0044719 | A1 | 11/2001 | Casey |
| 2003/0033094 | A1 | 2/2003 | Huang |
| 2003/0061008 | A1 | 3/2003 | Smith et al. |
| 2003/0208335 | A1* | 11/2003 | Unuma ............. A61B 5/681 702/141 |
| 2007/0288242 | A1 | 12/2007 | Spengler et al. |
| 2008/0140362 | A1 | 6/2008 | Gross et al. |
| 2008/0252309 | A1 | 10/2008 | Gross et al. |
| 2008/0252441 | A1 | 10/2008 | McElfresh et al. |
| 2008/0256398 | A1 | 10/2008 | Gross et al. |
| 2009/0099830 | A1 | 4/2009 | Gross et al. |
| 2009/0115635 | A1 | 5/2009 | Berger et al. |
| 2009/0125467 | A1 | 5/2009 | Dhanekula et al. |
| 2009/0306920 | A1 | 12/2009 | Zwinger et al. |
| 2010/0023282 | A1 | 1/2010 | Lewis et al. |
| 2010/0033386 | A1 | 2/2010 | Lewis et al. |
| 2010/0080086 | A1 | 4/2010 | Wright et al. |
| 2010/0161525 | A1 | 6/2010 | Gross et al. |
| 2010/0305892 | A1 | 12/2010 | Gross et al. |
| 2010/0306165 | A1 | 12/2010 | Gross et al. |
| 2012/0030775 | A1 | 2/2012 | Gross et al. |
| 2012/0245978 | A1 | 9/2012 | Jain et al. |
| 2013/0157683 | A1 | 6/2013 | Lymberopoulos et al. |
| 2013/0211662 | A1 | 8/2013 | Blumer et al. |
| 2015/0137830 | A1 | 5/2015 | Keller, III et al. |
| 2016/0098561 | A1 | 4/2016 | Keller et al. |
| 2016/0258378 | A1 | 9/2016 | Bizub et al. |
| 2017/0163669 | A1 | 6/2017 | Brown et al. |
| 2018/0011130 | A1 | 1/2018 | Aguayo Gonzalez et al. |
| 2018/0349797 | A1 | 12/2018 | Garvey et al. |
| 2019/0064034 | A1 | 2/2019 | Fayfield et al. |
| 2019/0102718 | A1 | 4/2019 | Agrawal |
| 2019/0163719 | A1 | 5/2019 | Gross et al. |
| 2019/0196892 | A1 | 6/2019 | Matei et al. |
| 2019/0197145 | A1 | 6/2019 | Gross et al. |
| 2019/0237997 | A1 | 8/2019 | Tsujii et al. |
| 2019/0243799 | A1 | 8/2019 | Gross et al. |
| 2019/0286725 | A1 | 9/2019 | Gawlick et al. |
| 2019/0324430 | A1 | 10/2019 | Herzog et al. |
| 2019/0378022 | A1 | 12/2019 | Wang et al. |
| 2020/0125819 | A1 | 4/2020 | Gross et al. |
| 2020/0144204 | A1 | 5/2020 | Keller, III et al. |
| 2020/0201950 | A1 | 6/2020 | Wang et al. |
| 2021/0081573 | A1 | 3/2021 | Gross et al. |
| 2021/0086024 | A1* | 3/2021 | McCarthy ............. G16H 50/30 |
| 2021/0158202 | A1 | 5/2021 | Backlawski et al. |
| 2021/0174248 | A1 | 6/2021 | Wetherbee et al. |
| 2021/0270884 | A1 | 9/2021 | Wetherbee et al. |
| 2022/0121955 | A1 | 4/2022 | Chavoshi et al. |
| 2023/0106024 | A1* | 4/2023 | Keith, Jr. ............. G16H 40/63 726/5 |

FOREIGN PATENT DOCUMENTS

| | | |
|---|---|---|
| EP | 0816986 A2 | 1/1998 |
| WO | 2020215116 A1 | 10/2020 |
| WO | 2021-007394 A1 | 1/2021 |

OTHER PUBLICATIONS

Patent Cooperation Treaty (PCT), International Search Report and Written Opinion issued in PCT International Application No. PCT/US2021/013633 having a date of mailing of May 6, 2021 (10 pgs).

Huang H, et al. "Electronic counterfeit detection based on the measurement of electromagnetic fingerprint," Microelectronics Reliability: An Internat . Journal & World Abstracting Service, vol. 55, No. 9, Jul. 9, 2015 (Jul. 9, 2015) pp. 2050-2054.

Bouali Fatma et al. "Visual mining of time series using a tubular visualization," Visual Computer, Springer, Berlin, DE, vol. 32, No. 1, Dec. 5, 2014 (Dec. 5, 2014), pp. 15-30.

Patent Cooperation Treaty (PCT), International Search Report and Written Opinion issued in PCT International Application No. PCT/US2021/014106 having a date of mailing of Apr. 26, 2021 (9 pgs).

Patent Cooperation Treaty (PCT), International Search Report and Written Opinion issued in PCT International Application No. PCT/US2021/015359 having a date of mailing of Apr. 9, 2021 (34 pgs).

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Whisnant et al.; "Proactive Fault Monitoring in Enterprise Servers," IEEE—International Multiconference in Computer Science & Computer Engineering (Jun. 27-30, 2005) 11 pgs.

US Nuclear Regulatory Commission; "Technical Review of On-Line Monitoring Techniques for Performance Assessment," vol. 1, Jan. 31, 2006.

Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.

Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.

Wald, A, "Sequential Probability Ratio Test for Reliability Demonstration", John Wiley & Sons, 1947.

Seyerlehner, et al.: "Frame Level Audio Similarity—A Codebook Approach", Proc. of the 11th Int. Conference on Digital Audio Effects (DAFx-08), Espoo, Finland, Sep. 1-4, 2008, pp. 1-8.

(56) References Cited

OTHER PUBLICATIONS

US Patent and Trademark Office, "Non-Final Office Action", issued in U.S. Appl. No. 17/506,200 having a date of mailing of Dec. 20, 2022 (10 pgs).
Yesilli et al.: "On Transfer Learning for Chatter Detection in Turning using Wavelet Packet Transform and Ensemble Empirical Mode Decomposition", CIRP Journal of Manufacturing Science and Technology, Elsevier, Amsterdam, NL, vol. 28, Dec. 30, 2019 (Dec. 30, 2019), pp. 118-135.
Abebe Diro et al.; A Comprehensive Study of Anomaly Detection Schemes in IoT Networks Using Machine Learning Algorithms; pp. 1-13; 2021; downloaded from: https://doi.org/10.3390/s21248320.
Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.
Choi Kukjin et al: "Deep Learning for Anomaly Detection in Time-Series Data: Review, Analysis, and Guidelines", IEEE Access, IEEE, USA, vol. 9, Aug. 26, 2021, (23 pgs).
Gross Kenny et al: "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.
Gross, Kenny, Oracle Labs; MSET2 Overview: "Anomaly Detection and Prediction" Oracle Cloud Autonomous Prognostics; p. 1-58; Aug. 8, 2019.
Gross, K. C. et al., "Application of a Model-Based Fault Detection System to Nuclear Plant Signals," downloaded from https://www.researchgate.net/publication/236463759; Conference Paper: May 1, 1997, 5 pages.
Verma, Guarav et al., "A Lexical, Syntactic, and Semantic Perspective for Understanding Style in Text," Sep. 18, 2019; pp. 1-9; BigData Experience Lab, Adobe Research, India.
Patent Cooperation Treaty (PCT), International Search Report and Written Opinion issued in PCT International Application No. PCT/US2023/083035 having a date of mailing of Apr. 9, 2024 (7 pgs).
Patent Cooperation Treaty (PCT), International Preliminary Report on Patentability issued in PCT International Application No. PCT/US2023/083035 having a date of mailing of Jul. 3, 2025 (6 pgs).

\* cited by examiner

MEASURING GAIT TO DETECT IMPAIRMENT

BACKGROUND

Mobile devices such as cellular telephones may include motion sensors such as accelerometers. The accelerometers may be used to detect motion of the mobile device. Time series data may be sampled from sensor signals such as outputs of an accelerometer.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
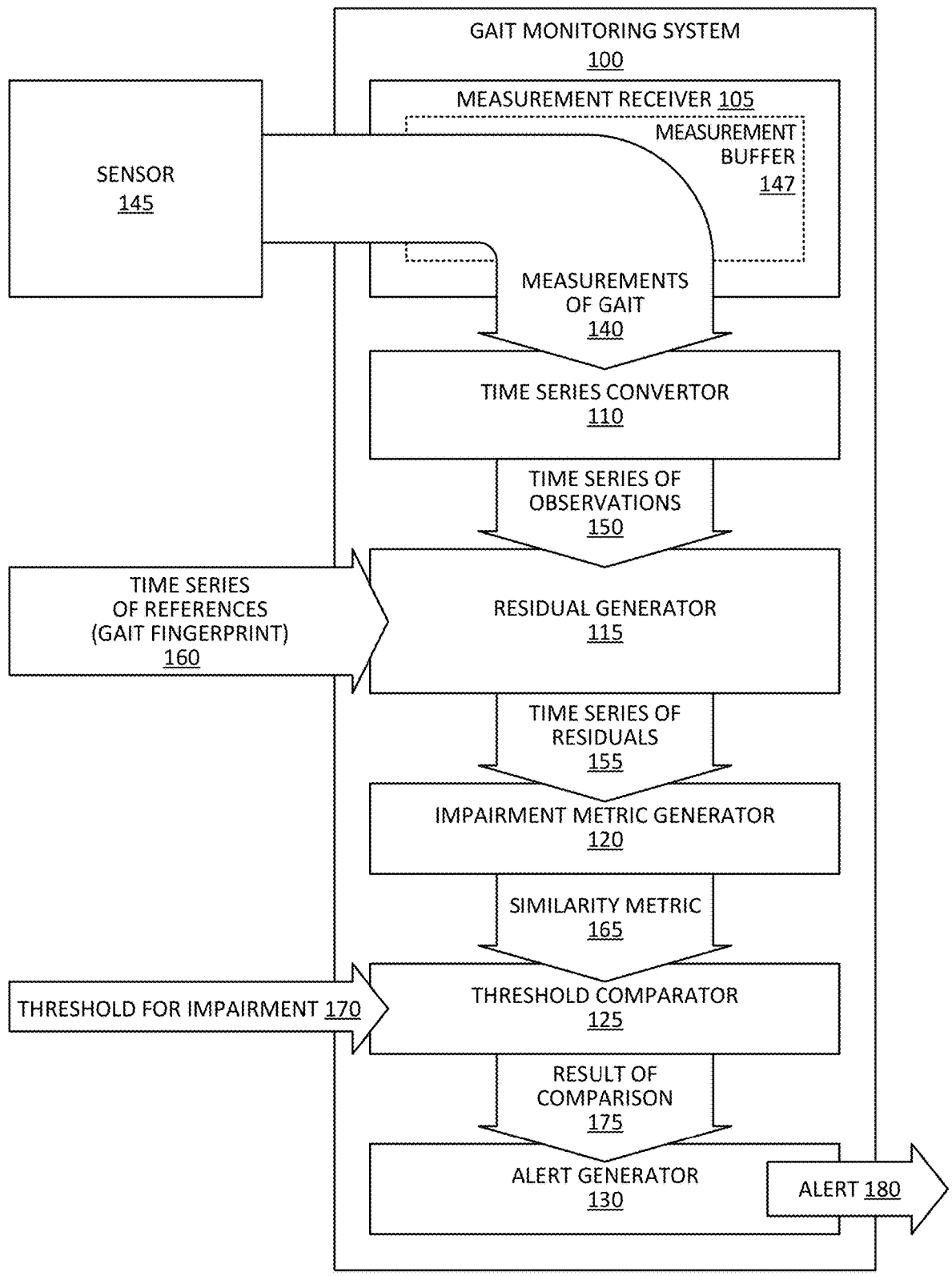
FIG. 1 illustrates one embodiment of a gait monitoring system associated with use of a vibration fingerprint for gait characterization and monitoring.

Systems, methods, and other embodiments are described herein that provide for monitoring gait in order to detect impairment. In one embodiment, a gait monitoring system employs a three-dimensional vibration fingerprint to characterize the gait of a human or other individual. In one embodiment, the gait monitoring system characterizes vibrations associated with an individual's movement, and compares them with a vibration fingerprint or vibration profile of unimpaired movement to determine if the individual is impaired. In short, a vibration pattern of a walk of an individual is checked against a reference vibration pattern in order to detect the onset or presence of impaired motion.

In one embodiment, the gait monitoring system receives measurements of a gait of an individual from a sensor. For example, sensor may be an accelerometer carried by the individual that senses the motion of the individual. The measurements are converted to a set of time series for various frequency bins (or ranges of frequency) of repeating motion. The sets of time series are compared to a reference set of time series values for the frequency bins of repeating motion. The reference set of time series values provide a baseline of unimpaired gait for the individual. The comparison produces residual values between observed gait and the baseline reference. An impairment metric may be developed from the residual values. If the impairment metric satisfies a threshold for impairment, the gait monitoring system generates an alert that the human is impaired.

In one embodiment, detection of impairment based on sensed gait, as discussed herein, can detect intoxication and be used to prevent operation of machinery, such as preventing intoxicated driving, until the impairment resolves. In one embodiment, detection of impairment based on sensed gait, as discussed herein, can early detect the onset of neurological damage (such as a stroke) and be used to launch an emergency care response within the initial "golden" hour for avoiding long term degradation of brain function or death. In one embodiment, detection of impairment based on sensed gait, as discussed herein, can early detect the onset of negative pharmacological effects, such as reactions to poisons present in an environment or adverse reactions to drugs, and be used to launch an emergency care response.

No action or function described or claimed herein is performed by the human mind. An interpretation that any action or function can be performed in the human mind is inconsistent with and contrary to this disclosure.

Definitions

As used herein, the term "gait" refers to the manner or pattern of movement of a body of an individual during locomotion of the individual over a surface.

As used herein, the term "locomotion" is a general term for motion of a being from place to place by foot, such as by walking, jogging, or running. For example, measurements of gait indicate a pattern and pace of stride for an individual.

As used herein, the term "impaired" or "impairment" refers to reduction or alteration of normal motor activity in an individual due to pharmacological exposure (such as alcohol or cannabis intoxication and adverse drug reactions or interactions) or neurological emergency (such as stroke or epileptic seizure).

As used herein, the terms "individual" or "being" refers to humans or animals that locomote. Thus, an individual or being may be either a human or an animal.

As used herein, the term "time series" refers to a data structure in which a series of data points (such as observations or sampled values) are indexed in time order. In one embodiment, the data points of a time series may be indexed with an index such as a time stamp and/or an observation number. As used herein, the terms "time series signal" and "time series" are synonymous.

As used herein, the term "time series database" refers to a data structure that includes one or more time series that share an index (such as a series of time stamps, positions, or observation numbers) in common.

As used herein, the term "residual" refers to the absolute value of a difference between a value (such as a measured, observed, sampled, or resampled value) and a reference, prediction, or estimate of what the value is expected to be. Thus, in one embodiment, a residual time series or time series of residuals refers to a time series made up of residual values between a time series of values and a time series of what the values are expected to be.

—Example Gait Monitoring System—

FIG. 1 illustrates one embodiment of a gait monitoring system 100 associated with use of a vibration fingerprint for gait characterization and monitoring. Gait monitoring system 100 includes components for monitoring the gait of an individual being, such as a person or animal. Components of gait monitoring system 100 may include a measurement receiver 105, a time series convertor 110, a residual generator 115, an impairment metric generator 120, a threshold comparator 125, and an alert generator 130. In one embodiment each of these components 110, 115, 120, 125, and 130 of gait monitoring system 100 may be implemented as software executed by computer hardware. For example, components 110, 115, 120, 125, and 130 may be implemented as one or more intercommunicating software modules, routines, or services for performing the functions of the components.

Measurement receiver 105 is configured to receive measurements of gait 140 of an individual from a sensor 145. In one embodiment, measurement receiver 105 stores the measurements of gait in a measurement buffer 147. In one embodiment, sensor 145 is an accelerometer, such as a multi-axis accelerometer. In one embodiment, the measurements of gait 140 are measurements of magnitude and direction of acceleration of sensor 145. In one embodiment, sensor 145 is carried by or otherwise borne on the body of the individual to produce, as the measurements of gait 140, measurements of magnitude and direction of acceleration while the individual is walking, jogging, or otherwise moving along on foot. The measurements of gait 145 may be monitored to detect impairment of the individual.

Time series convertor 110 is configured to convert the measurements of gait 140 into a time series of observations 150 for each frequency bin in a set of frequencies. Residual generator 115 is configured to generate a time series of residuals 155 for each frequency bin in the set by pointwise subtraction between the time series of observations 150 and a time series of references 160 for each range of the set. Time series of references 160 (or gait fingerprint) are time series for each frequency bin generated for unimpaired gait of the individual. impairment metric generator 120 is configured to generate an impairment metric 165 based on the time series of residuals 155. Threshold comparator 125 is configured to compare impairment metric 165 to a threshold for impairment 170. Threshold for impairment 170 may be pre-configured by a user or administrator of gait monitoring system 100. The result of comparison 175 is provided to alert generator 130, and indicates whether impairment metric 165 satisfies or does not satisfy the threshold for impairment 170. Alert generator 130 is configured to, in response to the impairment metric satisfying the threshold, generate an alert 180 that the individual is impaired.

Further details regarding gait monitoring system 100 are presented herein. In one embodiment, the operation of gait monitoring system 100 will be described with reference to example gait monitoring methods 200 and 700 shown in FIGS. 2 and 7. In one embodiment, generation of a gait fingerprint (or set of time series of references 160) by gait monitoring system 100 will be described with reference to an example gait fingerprinting method 600 shown in FIG. 6. In one embodiment, differentiation between unimpaired locomotion and impaired locomotion will be described with reference to an example impairment metric bar chart shown in FIG. 5. In one embodiment, identification of frequency bins that are most strongly associated with the gait of an individual will be discussed with reference to example spectrograms 400 and corresponding time series 405 generated from example measurements of gait shown in FIG. 4. In one embodiment, denoising of component time series will be discussed with reference to a plot 800 of non-denoised and denoised signals shown in FIG. 8. In one embodiment, phase synchronization and averaging of multiple signals will be discussed with reference to a plot 900 of time series for an individual locomoting at multiple paces as shown in FIG. 9.

—Example Gait Monitoring Method—

Figure 2:
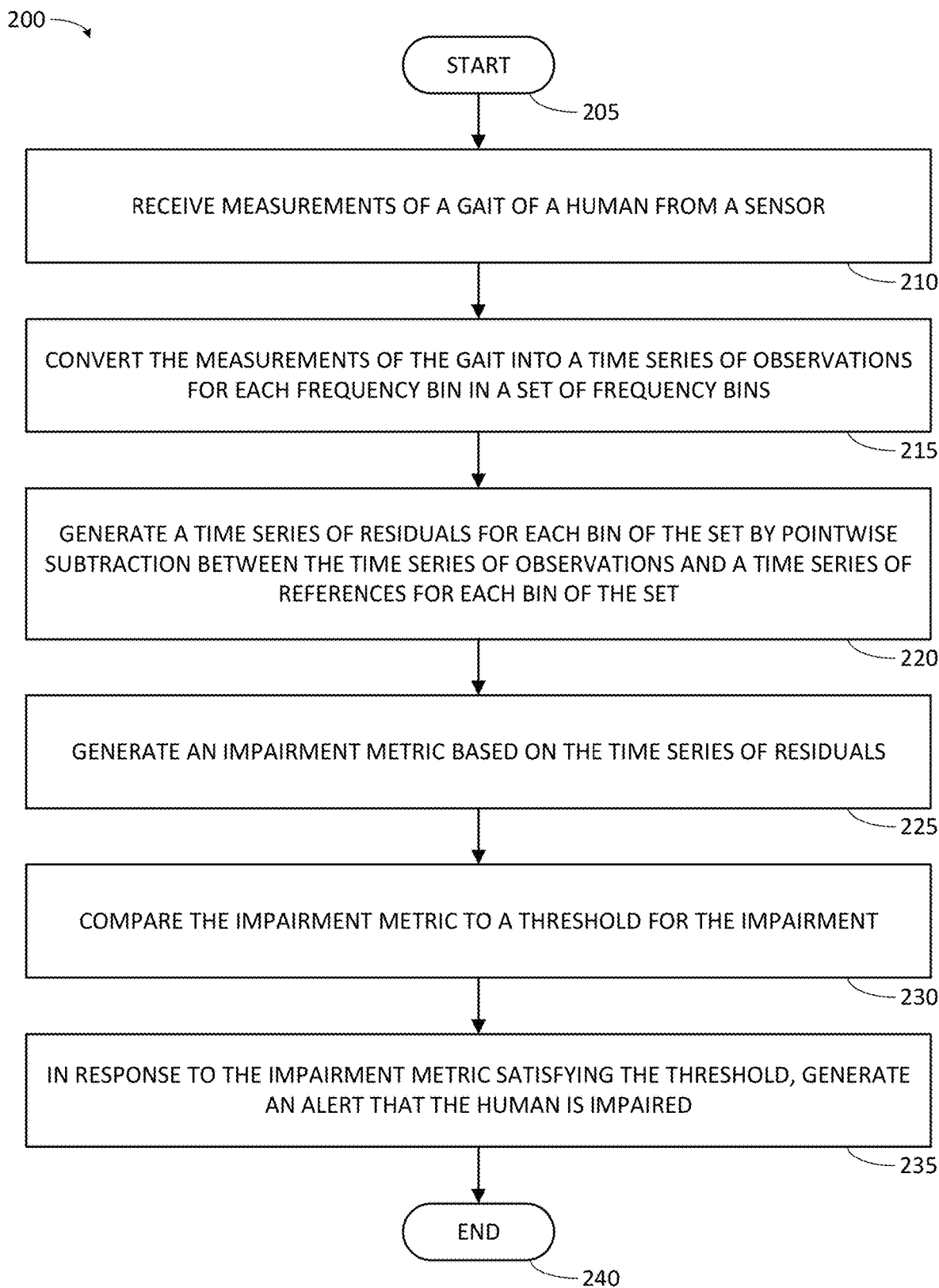
FIG. 2 illustrates one embodiment of a gait monitoring method associated with use of a vibration fingerprint for gait characterization and monitoring.

FIG. 2 illustrates one embodiment of a gait monitoring method 200 associated with use of a vibration fingerprint for gait characterization and monitoring. As an overview, in one embodiment, gait monitoring method 200 receives measurements of a gait of a human from a sensor. The gait of the human is monitored to detect impairment. Gait monitoring method 200 converts the measurements of the gait into a time series of observations from each frequency bin in a set of frequency bins. Then, gait monitoring method 200 generates a time series of residuals for each range of the set. The time series of residuals are generated by pointwise subtraction between the time series of observations and a time series of references for each range of the set. Gait monitoring method 200 generates an impairment metric based on the time series of residuals. Gait monitoring method 200 compares the impairment metric to a threshold for the impairment. In response to the impairment metric satisfying the threshold, gait monitoring method 200 generates an alert that the human is impaired.

In one embodiment, gait monitoring method 200 initiates at START block 205 in response to a gait monitoring system determining one or more of (i) an incoming stream of measurements of a gait has been detected; (ii) that an instruction to perform gait monitoring method 200 on measurements of a gait has been received (iii) a user or administrator of gait monitoring system 100 has initiated gait monitoring method 200; (iv) it is currently a time at which gait monitoring method 200 is scheduled to be run; or (v) that gait monitoring method 200 should commence in response to occurrence of some other condition. In one embodiment, a computer configured by computer-executable instructions to execute functions of gait monitoring system 100 executes gait monitoring method 200. In one embodiment, the steps of gait monitoring method 200 or other methods herein are performed as a streaming workflow that processes measurements of the gait as they arrive from a sensor. Following initiation at start block 205, gait monitoring method 200 continues to process block 210.

—Example Gait Monitoring Method—Receiving Gait Measurements—

At process block 210, gait monitoring method 200 receives measurements of a gait of a being from a sensor. The gait of the being is monitored to detect impairment. For example, the accelerometer records measurements of vibration or motion of an individual being while the individual is walking or otherwise locomoting.

In one embodiment, the sensor is an accelerometer. For example, the sensor may be an on-board accelerometer integrated with a mobile device. In one embodiment, accelerometer may be a solid-state accelerometer integrated circuit. In one embodiment, the accelerometer may produce readings of acceleration at a sampling rate of many times per second, for example, the accelerometer may produce one reading every few milliseconds.

The accelerometer is placed on or borne on the body of the individual, for example by carrying the mobile device in a pocket. The individual locomotes (for example, walks) while the accelerometer is on body of the individual to cause the accelerometer to measure or detect the motion of the accelerometer that is caused by the gait of the individual. In one embodiment, the measurements of the gait characterize or quantify a cyclic pattern of motion performed by an individual during locomotion. The locomotion of the individual may be performed at various speeds while bearing the accelerometer. For example, accelerometer readings may be taken while the individual walks at a slow pace, taken again while the individual walks at a moderately faster pace, and so on repeatedly increasing the pace of the gait. In one embodiment, the measurements of gait cover a range or window of time. For example, the measurements of gait may detect the motion of the carried accelerometer for two minutes of locomotion at a time.

In one embodiment, where the sensor is an accelerometer, a measurement of the gait is an accelerometer reading detected by the accelerometer. In one embodiment, individual accelerometer readings are data structures that include acceleration values for multiple axes of motion detected by the accelerometer. For example, the accelerometer may sense acceleration along three orthogonal (e.g., x-y-z) axes or directions, and produce a data structure including magnitudes of acceleration for each direction.

In one embodiment, gait monitoring method 200 receives measurements of the gait from the accelerometer (e.g., from sensor 145) as a stream of accelerometer readings. The accelerometer readings are the measurements of the gait. The stream of accelerometer readings—readings of magnitude of acceleration along axes of the accelerometer—are presented to, accessed by, or otherwise received by gait monitoring system 100 as the readings are generated by the accelerometer.

As the accelerometer readings are received, they are written into memory (for example into measurement buffer 147) along with a time stamp. The time stamp indicates when the accelerometer reading was taken. In one embodiment, a time series of accelerometer readings that measure the gait is thereby produced in the memory. In one embodiment, the time series of accelerometer readings records the accelerometer readings at the sampling rate produced by the accelerometer, with one time-stamped data point for each accelerometer reading. In one embodiment, the time series of accelerometer readings down-samples the accelerometer readings by recording one time-stamped data point for every few accelerometer readings, for example, recording one in ten accelerometer readings.

In one embodiment, the time series of measurements is of a pre-determined length. The pre-determined length covers a pre-determined amount of time. The pre-determined length operates to separate a continuous stream of accelerometer measurements of gait into analyzable segments or windows. The amount of time and/or length of the time series is selected to strike a balance between adequate representation of cyclic activity in the gait, and promptness of detecting anomalous impairment in the gait. In one embodiment, a time series that covers an amount of time between approximately one and three minutes, such as a time series with readings covering two minutes (120 seconds) offers a satisfactory balance. In this time scale, the individual may locomote for tens or hundreds of steps, while onset of impairment will continue for no more than a few minutes before detection. In one example, where the accelerometer and resulting time series of measurements have a sampling rate of 2000 Hertz, a time series of measurements that is 240,000 observations in length is produced. The measurements of the gait may be further analyzed either to detect impairment in the measured gait, or to produce a gait fingerprint of normal gait.

Thus, in one embodiment, an accelerometer produces a series of measurements of magnitude of acceleration along multiple axes associated with the gait of a human, the measurement receiver collects the measurements as they are produced by the accelerometer and writes the measurements into memory (for example, as a time series of accelerometer readings), and the measurement receiver provides the series of measurements to a time series converter 210 after the measurements cover a window of time, for example, two minutes. Process block 210 then completes, and gait monitoring method 200 continues at process block 215. In one embodiment, the functions of process block 210 are performed by gait monitoring system 100 and sensor 145. At the completion of receiving measurements of a gait of a being from a sensor, a series of measurements of gait covering a time range of gait are collected and made available for subsequent analysis. The measurements of gait of the being may be used to determine impairment of the being, for example as part of a gait fingerprint, or for example by representing impaired locomotion of the being.

—Example Gait Monitoring Method—Conversion to Frequency Bin Time Series—

At process block 215, gait monitoring method 200 converts the measurements of the gait into a time series of observations from each frequency bin in a set of frequency bins. In one embodiment, the conversion changes the broad-spectrum measurements of gait recorded in the time series of measurements into separate time series for specific ranges of frequency within the broad spectrum. In one embodiment, the conversion produces a time series for each of a set of frequency bins that are most associated with locomotion.

In one embodiment, as discussed above, the measurements of gait are a time series of accelerometer readings along various axes. The time series of measurements includes cyclic or vibrational movement detected by the accelerometer at a variety of differing frequencies. Not all the cyclic or vibrational activity is associated with a normal, unimpaired gait of the individual. Therefore, the time series of measurements of the gait should be converted into several time series of component cyclic or vibrational movement that occurs in frequency bins that are associated with a normal gait of the individual.

At a high level, converting the measurements of gait into several time series of observations for differing frequency bins involves performing a time domain-frequency domain-time domain double transformation. A time domain to frequency domain transformation, such as a fast Fourier transform, is performed on the time series of measurements of the gait to produce a power spectrum (such as power spectral density curve or periodogram) for the measurements. The power spectrum is subdivided into a number of frequency bins. Those frequency bins associated with a normal, unimpaired gait of the individual are then sampled to produce time series for the frequency bins, thus transforming the sampled frequency bins from the frequency domain back into the time domain. In this way, the measurements of gait are converted into a time series of observations for each frequency bin in the set of frequency bins that are associated with normal, unimpaired gait.

The power spectrum for the measurements of the gait is defined by a power spectral density function resulting from the Fourier transform of the measurements of the gait. In one embodiment, the Fourier transform is performed for each of the axes of acceleration and the results are appropriately combined through axis rotation and vector summation in order to produce an aggregate power spectral density function for the measurements of the gait on all axes. In one embodiment, the individual accelerometer readings on each axis are summed, and the Fourier transform of the summed accelerometer readings is performed in order to produce an aggregate power spectral density function for the measurements of the gait on all axes. In one embodiment, the power spectral density function for a single axis of the measurements can be substituted for the aggregate power spectral density function. In one embodiment all three axes can be analyzed individually.

In one embodiment, as mentioned above, the power spectrum for the measurements of the gait is subdivided or partitioned into discrete, contiguous frequency bins. The frequency bins are discrete frequency ranges with respect to one another and do not overlap. The frequency bins are contiguous ranges of frequency within the power spectrum with respect to each other and collectively leave no gaps between adjacent bins. The frequency bins are frequency ranges of approximately equal width, covering similar range intervals of the frequency spectrum. The set of all the frequency bins covers the power spectrum. It has been empirically determined that 100 frequency bins adequately dissect the power spectrum for analysis of human gait. Thus, in one embodiment, the power spectrum for the measurements of the gait is subdivided into 100 discrete, contiguous frequency ranges or bins.

In one embodiment, the set of frequency bins that the measurements of gait are converted to time series for is a subset of the frequency bins that are most associated with a normal gait of the individual. In one embodiment, the set of frequency bins that are most associated with a normal gait is a subset of the set of frequency bins that have highest amplitudes in the power spectrum when the individual locomotes normally, without impairment. For example, the top 10 frequency bins in terms of amplitude for normal locomotion are selected. These top frequency bins are identified based on reference measurements of gait taken while the individual locomotes normally. Additional detail on the selection of the set of frequency bins for which time series will be generated is discussed below, for example under the heading "Identifying Top Frequency Bins".

A time series of observations is generated from the measurements of gait for each of the frequency bins in the set. In one embodiment, a time series is generated for a frequency bin by reporting out the value for the frequency bin at an interval. In one embodiment, an interval of 2 seconds or lower has been determined to be satisfactory, for example an interval of 1 second. The values for more than one frequency bin may be reported out. For example, where the power spectrum is divided into 100 frequency bins, by reporting out the value of each frequency bin every second, 100 frequency bins are converted to 100 time series, each having a 1-second sampling rate (1 Hertz). Producing one time series per frequency bin sampled at the interval results in a set of time series of observations (of the frequency bins) sampled at a rate in common, or a time series database of observations. As used in the terms time series of observations or time series database of observations, an observation refers to an amplitude value that is sampled from a frequency bin.

In one embodiment, a time series is generated for each frequency bin for the whole power spectrum, and then selecting the subset of time series that correspond to the top frequency bins with highest amplitudes. For example, all 100 bins covering the power spectrum are converted into time series and then the subset of time series generated from the top 10 bins in terms of power amplitude are selected. In either case, a time series of observations from each frequency bin in the set of top frequency bins is generated by the conversion back to the time domain.

Figure 3:
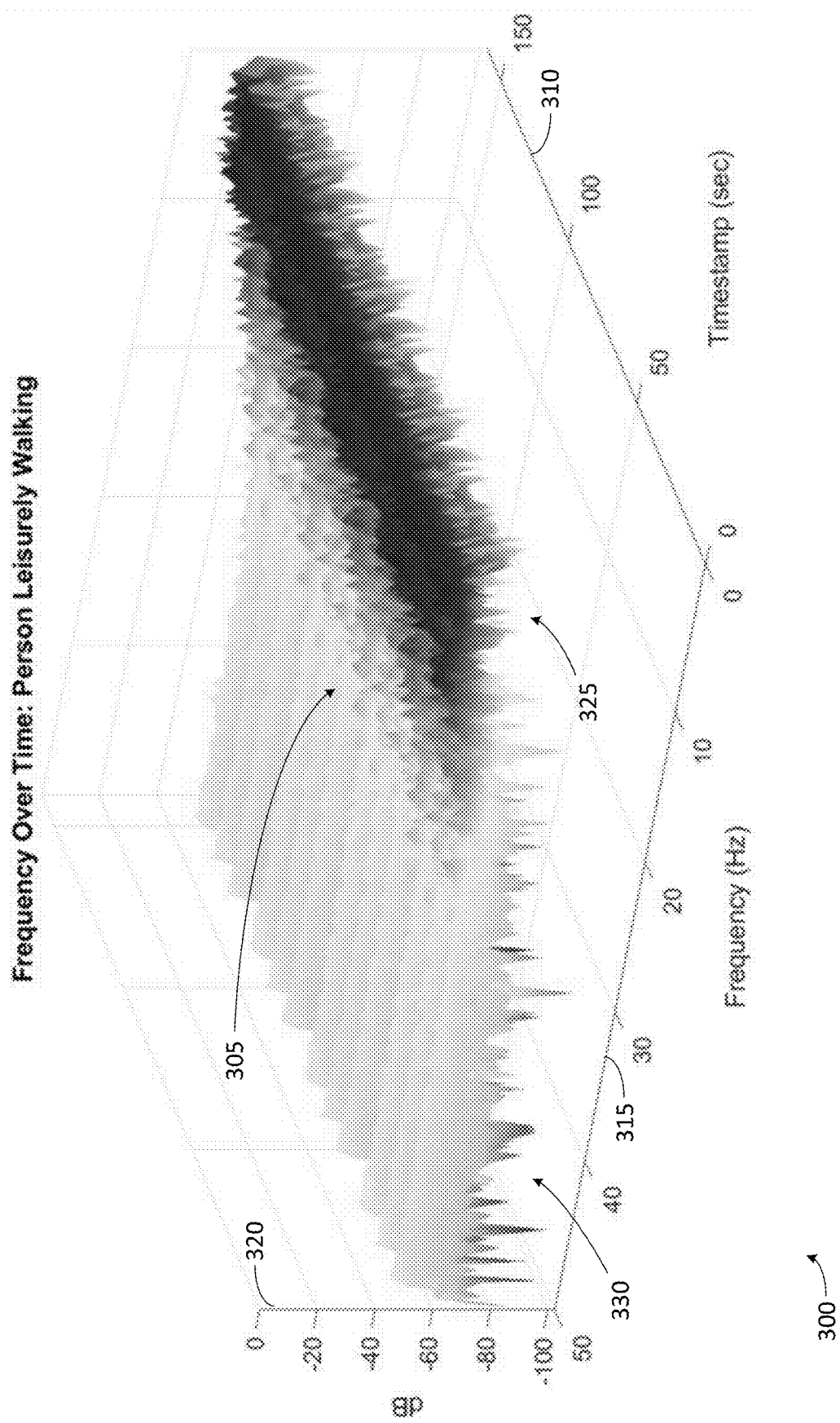
FIG. 3 illustrates a three-dimensional plot of example measurements of gait of an individual human.

Referring briefly to FIG. 3, FIG. 3 illustrates a three-dimensional plot 300 of example measurements of gait 305 of an individual human. Measurements of gait 305 show frequency change over time while the human is walking slowly. The example measurements of gait 305 are plotted as a three-dimensional surface against a time axis 310, a frequency axis 315, and an amplitude axis 320. In one embodiment, the amplitude of the example measurements of gait 305 is the aggregate amplitude along all axes of motion sensed by the sensor, for example, the vector sum of the magnitudes of acceleration on all axes. Here, the power spectrum for example measurements of gait 305 covers 0 to 50 Hz, as shown along frequency axis 315. The example measurements of gait 305 are divided into bins along frequency axis 315, for example, into 100 bins. Note that content at the lower frequencies 325 is stronger (having higher amplitude) than the content at the higher frequencies 330. Thus, where the example measurements of gait 305 are used as a reference or gait fingerprint of the normal locomotion of the human, the top bins that will be selected as best characterizing (most associated with) the normal gait will be chosen from among the bins including content at the lower frequencies 325.

Figure 4:
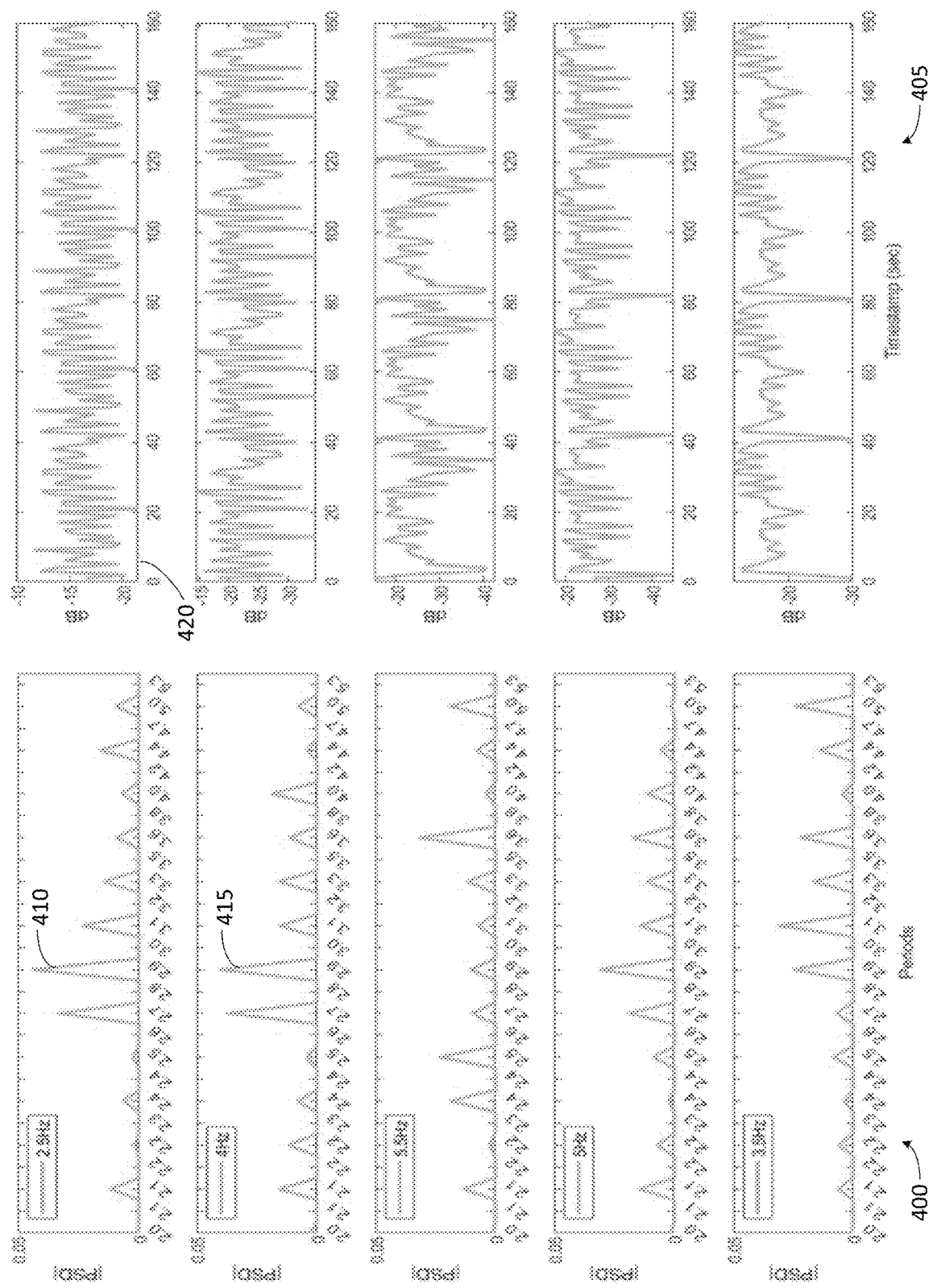
FIG. 4 illustrates spectrograms of example power spectra and plots of corresponding example time series for an example of top ranked frequency bins from example measurements of gait.

Referring now to FIG. 4, FIG. 4 illustrates spectrograms of example power spectra (power spectral density) 400 and plots of corresponding example time series 405 for an example of top 5 ranked frequency bins from example measurements of gait 305. The behavior of example measurements of gait 305 is further analyzed in the frequency domain as shown in FIG. 4. The peaks in the frequency domain power spectra 400 correspond with the cyclic gait motions of the human that is slowly walking. The top five frequency bins 405 are those frequency bins of the 100 bins along frequency axis 315 that have the strongest frequency components (highest peaks) in their power spectrum. In one embodiment, the top 10 bins are selected based on the height of the peak in the frequency domain. (Just the top 5 bins are shown in FIG. 4 for brevity). The frequency bin centered on 2.5 Hz has the highest peak 410 in the example power spectra 400, showing the frequency bin for 2.5 Hz to be the most associated with the slow walk by the human. The frequency bin centered on 4 Hz has the second highest peak 415 in the example power spectra 400, showing the frequency bin for 4 Hz to be the second most associated with the slow walk by the human, and so on down through the frequency bins ranked in descending order of highest peak in power spectrum until the top 10 bins are selected. The example time series 405 are time series of observations sampled from corresponding frequency bins at 1 second intervals over 160 seconds. For example, example time series of observations 420 is sampled from the frequency bin for 2.5 Hz.

Referring again to process block 215 of FIG. 2, in one embodiment, gait monitoring method converts measurements of the gait into a time series of observations for each frequency bin in a set of frequency bins by transforming the measurements of the gait to the frequency domain to produce a power spectrum of the measurements; subdividing the power spectrum into a number of frequency bins, sampling each of a set of frequency bins that are most associated with a normal gait at an interval to produce a time series of observations (amplitude values for a bin) for each bin in the set of frequency bins. Process block 215 then completes, and gait monitoring method 200 continues at process block 220. In one embodiment, the functions of process block 215 are performed by time series convertor 110. In one embodiment, at the completion of process block 215, a time series database of observations has been generated that includes time series of amplitudes sampled from those frequency bins most associated with normal gait of an individual. This time series database of observations may be compared with a time series database of references that includes time series of reference values amplitudes sampled from those frequency bins when the individual is locomoting normally to determine whether the measured gait differs substantially from a reference gait. In one embodiment, the set of time series of observations for each bin of the set may be referred to herein as a current or observed gait fingerprint.

—Example Gait Monitoring Method—Generation of Residuals—

At process block 220, gait monitoring method 200 generates a time series of residuals for each bin of the set by pointwise subtraction between the time series of observations and a time series of references for each bin of the set. In other words, the gait monitoring method finds the differences between data points in the time series of observations and data points at corresponding indexes in a time series of references, and stores the differences to create a time series.

As mentioned above, a time series of residuals is a time series made up of residuals-values of differences between a given value and what the value is expected to be. A time series of observations for a frequency bin (such as those produced by process block 215) stores a series of amplitude values at the frequency bin indexed in order of time. A time series of references for the frequency bin stores a series of what the amplitude value at the frequency bin is expected to be at each data point. The index positions are spaced at an interval, for example, one second (a sampling rate of 1 Hz), as discussed above. The data points in the time series of observations thus share a series of index positions in common with the time series of references. In this way a value in the time series of observations corresponds to an estimated value at a corresponding index position in the time series of references.

In one embodiment, a time series of references is a time series of values for normal, unimpaired locomotion of an individual that are taken from one frequency bin. A time series of references for a frequency bin provides a sequence of expected values for the frequency bin due to locomotion. In one embodiment, there are time series of references for more than one frequency bin, for example, a time series of references for each of a set of top frequency bins most associated with normal, unimpaired motion by an individual. The set of time series of references for each of the top frequency bins most associated with normal, unimpaired locomotion of the individual may also be referred to herein as a time series database of references or as a reference gait fingerprint.

In one embodiment, each time series of references may be created based on measurements of gait of the individual during a training session in which the individual locomotes normally, without impairment. In one embodiment, the time series database of references may be created from measurements taken in multiple training sessions. In one embodiment, in the multiple training sessions, the individual locomotes at a pace in one training session that differs from a pace of another training session. In other words, the individual locomotes at a different pace in each of the multiple training sessions, for example, locomoting in each training session at paces of increasing speed. In one embodiment (as discussed in further detail below under the heading "Phase Synchronization"), the time series database of references from the multiple training sessions may be phase normalized in order to synchronize the differing pace speeds, and then each time series of references averaged across the multiple training sessions in order to generate the time series of references.

In one embodiment, the set of time series of references may be stored upon creation, and retrieved from storage for use in generating residuals at process block 220 (as indicated by input of time series of references 160 to residual generator 115). The time series of references may be stored along with an identifier for the individual. In one embodiment, gait monitoring method 200 looks up the identifier for the individual, and accesses and retrieves a set of time series of references associated with the individual.

A time series of values and a time series of expected values may be subtracted pointwise to produce a time series of residuals. In pointwise subtraction, the values at corresponding indexes of two time series are subtracted to generate the value for the difference or residual at the indexes. The pointwise subtraction proceeds data point-by-data point—that is, index position-by-index position—through the two time series. At each index position, the pointwise subtraction subtracts or finds the difference between the actual value of the data point in the time series of observations and the estimated value for the data point in time series of references. The absolute value of the difference at the index position is then taken to produce a residual value at the index position. The residual value resulting from finding the absolute value of the pair-wise difference between actual and estimated value for each index position is placed into a time series at the index position to create a time series of residuals.

In one embodiment, time series of residuals are generated for multiple frequency bins. In particular, time series of residuals may be generated for each frequency bin in the set of top frequency bins that are most associated with unimpaired or normal gait. For example, a times series of observations and a time series of references may be obtained for each of the set of top ten frequency bins, and used to generate time series of residuals for each of the top ten frequency bins. In this way, a time series of residuals may be generated for each bin in the set of frequency bins.

In one embodiment, the gait monitoring method generates a time series of residuals for each bin of the set by pointwise subtraction between the time series of observations and a time series of references for each bin of the set by accessing a set of time series of references for each frequency bin in a set of frequency bins most associated with normal, unimpaired gait; accessing the set of time series of observations for each frequency bin in the set of frequency bins most associated with normal, unimpaired gait; for each frequency bin in the set, finding the differences between the values of the time series of observations for the frequency bin and the values of the time series of references for the frequency bin; and placing the absolute values of these differences as residuals into a time series of residuals. Process block 220 then completes, and gait monitoring method 200 continues at process block 225. In one embodiment, the functions of process block 220 are performed by residual generator 115. At the completion of process block 220, gait monitoring method 200 has created a time series database (a set of time series) of residuals between a current gait of an individual and a reference gait of unimpaired motion by the individual based on the frequencies that are most representative of the unimpaired motion. The time series database of residuals may be used to generate an impairment metric that indicates how substantially the currently measured gait differs from the reference gait.

—Example Gait Monitoring Method—Generation of Impairment Metric—

At process block 225, gait monitoring method 200 generates an impairment metric based on the time series of residuals. The impairment metric indicates how much the measured gait differs from a reference gait. The impairment metric represents, in a single number, an extent to which the time series of residuals shows the current gait of the individual to diverge from the reference gait for unimpaired locomotion.

In one embodiment, the impairment metric is cumulative mean absolute error (CMAE) over the set of time series of residuals. Because, in one embodiment, the impairment metric represents the CMAE for motion of a human individual due to the gait of the individual, the impairment metric may be referred to occasionally herein as a human gait dynamics (HGD) CMAE. In one embodiment, to generate the impairment metric, the mean absolute error (MAE) is determined for the time series of residuals for each frequency bin, and the resulting MAEs for each frequency bin are summed to produce the CMAE across all the frequency bins. In this way, the impairment metric is generated based on the time series of residuals.

As discussed above, the residual is the value of the difference between two values. The residual may also be referred to as the error between the two values. The mean absolute error (MAE) for a frequency bin is the average value of the absolute value of the residuals in the time series of residuals for the frequency bin. The MAE for a frequency bin quantifies similarity or likeness of the measured gait with the reference gait in the range of frequencies covered by the frequency bin. In one embodiment, the gait monitoring method calculates the MAE from the time series of residuals for each frequency. To calculate the MAE for a time series of residuals, the values of the residuals in the time series of residuals are summed, and then divided by the count of residuals in the time series. In other words, the sum of the residuals in a time series of residuals is divided by the length of the time series to generate the MAE.

As discussed above, the MAE is calculated for each frequency bin and the MAE values are subsequently summed to calculate the HGD CMAE (the impairment metric). If an individual person is not impaired their gait will be only marginally different from the reference gait, and the residuals for each frequency bin will be small. Hence, the MAEs and the HGD CMAE will also be small. If the person is impaired their gait (including stride patterns and step frequency) will be altered. When impaired measurements are compared to the original Gait Fingerprint the resulting residuals, MAEs, and HGD CMAE will be significantly higher.

Thus, in one embodiment, the gait monitoring method 200 generates an impairment metric based on the set of time series of residuals by calculating the mean absolute error of each time series of residuals in the set, and adding up the mean absolute errors of all of the time series of residuals in the set to produce the cumulative mean absolute error of the residuals, which is the impairment metric. Process block 225 then completes, and gait monitoring method 200 continues at process block 230. In one embodiment, the functions of process block 225 are performed by impairment metric generator 120. At the completion of process block 225, the complex question of the extent to which a currently measured gait of an individual resembles a reference gait of the individual locomoting while unimpaired has been characterized with a simple impairment metric. This impairment metric may be used to determine whether or not the individual has become impaired.

—Example Gait Monitoring Method—Comparison with Impairment Threshold—

At process block 230, gait monitoring method 200 compares the impairment metric to a threshold for the impairment. In one embodiment, gait monitoring method 200 makes the comparison to determine whether the impairment metric (CMAE) satisfies a threshold indicating impairment of locomotion (also referred to as an impairment threshold). The impairment threshold provides a value at which the impairment metric transitions from indicating low likelihood of impairment of the individual to indicating high likelihood of impairment of the individual.

In one embodiment, the impairment threshold X discriminates between impaired and non-impaired classification. The value for the threshold X may be a configurable parameter that may be adjusted by a user or administrator of gait monitoring system 100. In one embodiment, the threshold is dependent on the length of time covered by and the sampling rate of the time series of observations, of references, and of residuals. For example, where the length of time covered is two minutes (120 seconds), and the sampling rate is 1 sample per second (1 Hz), a threshold between 10 and 14 (such as a threshold of 12) for the impairment metric satisfactorily differentiates between unimpaired and impaired locomotion. For example, where the impairment metric for a person exceeds a threshold of 12 there is a high likelihood that the person is in an impaired state, while below the threshold of 12, there is a low likelihood that the person is in an impaired state.

In one embodiment, the impairment threshold X may be generalized to different rates of time and sampling rates. For example, the threshold may be the product of the length of time T covered by the time series of residuals (or observations or references) times the sampling rate S of the time series of residuals (or observations or references) divided by approximately 10 (X=T*S/10).

In one embodiment, the impairment metric is compared to the impairment threshold X to determine whether the threshold X is satisfied. In one embodiment, gait monitoring method 200 compares the impairment metric to a threshold to determine whether the impairment metric is less than, equal to, or greater than the threshold for impairment. In one embodiment, the impairment metric satisfies the impairment threshold by being greater than the threshold (or by being greater than or equal to the threshold). The results of the comparison, an indication either that the threshold is satisfied (e.g., by being greater than the threshold) or that the threshold is not satisfied (e.g., by being less than the threshold) is then recorded. For example, the gait monitoring method may write the result of the comparison to memory for subsequent retrieval and processing.

Figure 5:
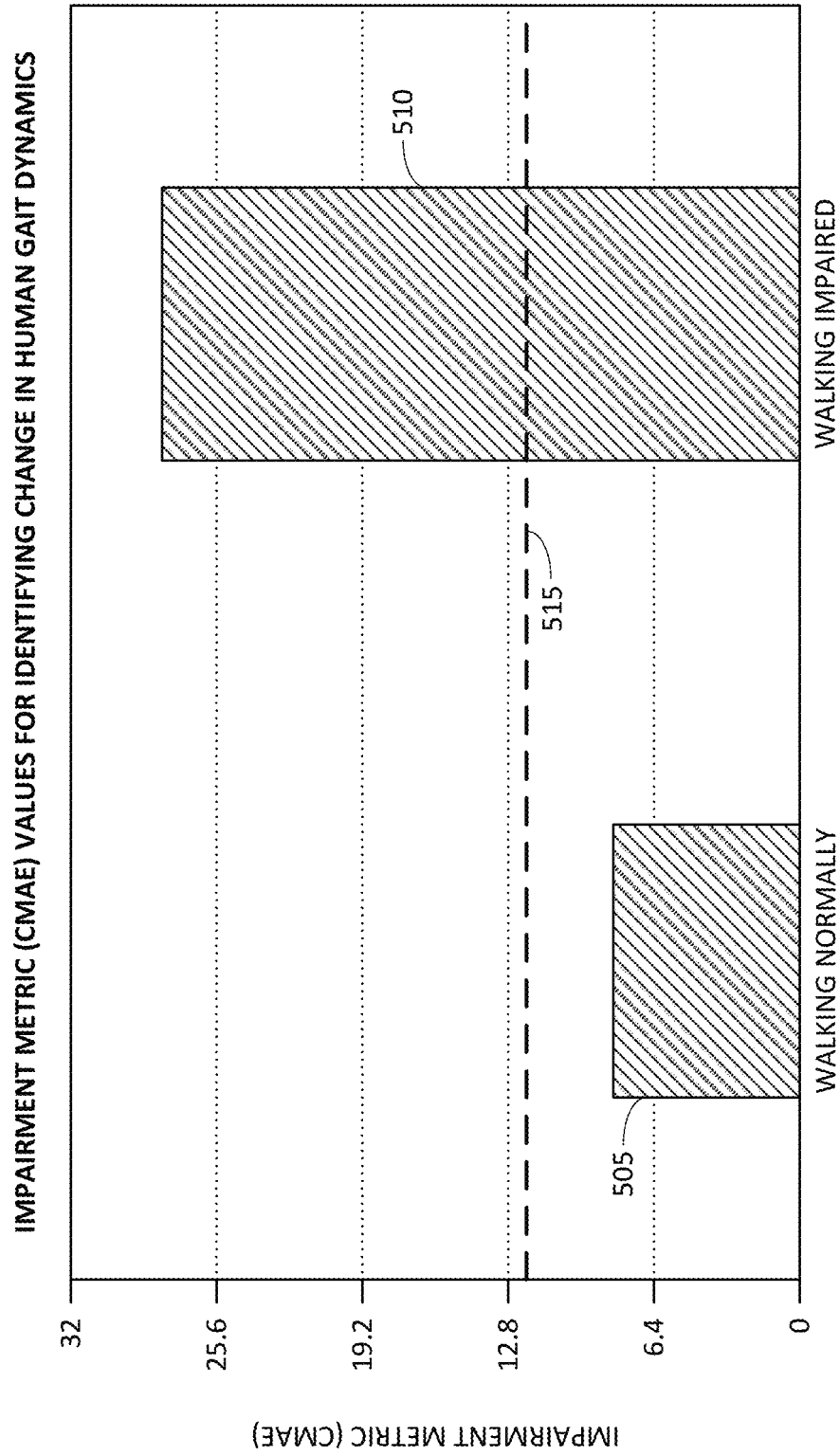
FIG. 5 illustrates a bar chart that shows the difference in the impairment metric values between example normal and impaired states.

Referring now to FIG. 5, FIG. 5 illustrates a bar chart 500 that shows the difference in the impairment metric (HGD CMAE) values between example normal and impaired states. Bar chart 500 shows impairment metric values for the two cases, walking normally and walking impaired. Bar chart 500 shows an unimpaired state value 505 (of approximately 8) for impairment metric that represents an individual that is walking normally, in an unimpaired state. Bar chart 500 also shows an impaired state value 510 (of approximately 28) for impairment metric that represents an individual that is walking abnormally, in an impaired state. The impaired state value 510 for the impairment metric—representing the person walking irregularly and inconsistently—is more than 3 times higher than the unimpaired state value 505 for the impairment metric that represents the person walking in a more regular and consistent fashion.

The impairment metric can be used to determine with a high likelihood when a person may be in an impaired state due to medical emergency or conscious-altering intoxication. The certainty that the individual is impaired increases as the impairment metric value increases. An impairment threshold for differentiating between normal walking and impaired walking may be empirically derived. In one embodiment, the impairment threshold is derived based on a value for the impairment metric calculated from the reference gait fingerprint of normal locomotion for a being. (For convenience, the value for the impairment metric calculated from the reference gait fingerprint of normal locomotion for may be referred to herein as the "reference baseline".) For example, the impairment threshold for a being may be set at some additional percentage more than the reference baseline for the being. For example, the impairment threshold may be set at approximately an additional 50% of the reference baseline for the being. Other values for the impairment threshold may be used. For example, a more restrictive impairment threshold may be set at an additional 20% of the reference baseline. Or, for example, a more relaxed impairment threshold may be set at an additional 100% of the reference baseline. In this way, the impairment threshold may be made dynamic and able to adjust for differing beings or reference gait fingerprints.

In FIG. 5, an example impairment threshold 515 has been generated empirically (as discussed above) from the reference gait fingerprint of the individual. Example impairment threshold 515 has an impairment metric value of 12. Example impairment threshold 515 clearly differentiates between walking normally and walking impaired. Comparing the unimpaired state value 505 (of approximately 8) to example impairment threshold 515 of 12 shows that the impairment metric for walking normally does not rise to the threshold level that indicates a high likelihood of impairment. Comparing the impaired state value 510 (of approximately 28) to example impairment threshold 515 of 12 shows that the impairment metric for walking impaired far exceeds the threshold level that indicates a high likelihood of impairment, indicating high certainty of impairment.

Thus, in one embodiment, the gait monitoring method 200 compares the impairment metric to a threshold for impairment by retrieving values for an impairment threshold and the impairment metric (CMAE); comparing the impairment metric to the impairment threshold; determining that the impairment metric satisfies the impairment threshold, for example by the value of the impairment metric meeting or exceeding the value of the impairment threshold (or determining that the impairment metric does not satisfy the impairment threshold, for example by the value of the impairment metric falling below the value of the impairment threshold); and storing the results of the determination indicating the threshold to be satisfied (or unsatisfied). Process block 230 then completes, and gait monitoring method 200 continues at process block 235. In one embodiment, the functions of process block 230 are performed by threshold comparator 125.

—Example Gait Monitoring Method—Alert Generation—

At process block 235, in response to the impairment metric satisfying the threshold, gait monitoring method 200 generates an alert that the being is impaired. When the impairment metric indicates impairment of the individual, a message is generated to inform the being, another individual, or an emergency response system that the individual has become impaired. In one embodiment, the alert may be generated by a mobile device that includes the sensor (accelerometer) used to monitor the gait of the individual.

As discussed herein, a being may be impaired by the onset of a medical emergency, such as a stroke or poisoning, or by intoxication, such as with alcohol, cannabis, or other intoxicants. Impairment affects the motion of a being such that the gait of the being while impaired does not conform to a reference gait for unimpaired motion by the being. Once the breakdown in the gait of the being has progressed to a stage that it is different enough from normal, unimpaired gait for the impairment metric to satisfy the impairment threshold, it is highly likely that the being has become impaired in its movement.

In one embodiment, the method generates an alert that the being or individual is impaired by composing a message that indicates or states that the being is impaired. In one embodiment, the message includes the value of the impairment metric (CMAE). In one embodiment, the message includes the value of the impairment threshold. In one embodiment, the message includes an indication or statement that the impairment metric has reached or exceeded the impairment threshold as justification or support for the alert that the being or individual is impaired. In one embodiment, the message includes location information such as GPS coordinates, latitude and longitude, address, or other location information which may be of use in rendering an emergency response to provide care for the individual.

Note that, in one embodiment, process blocks 210 through 230 of gait monitoring method may repeat in a loop until the threshold for impairment is satisfied by the most recent impairment metric. In other words, the gait of an individual is monitored until impairment is detected, at which point the alert is generated. For example, the gait of the individual may be monitored in approximately two-minute (120 second) intervals, as discussed above. In one embodiment, after the completion of each approximately two-minute interval, the impairment metric over that interval is calculated, compared with the impairment threshold, and stored along with the results of the threshold comparison. When the impairment metric satisfies the impairment threshold, process block 235 executes and the alert is generated. In one embodiment, the message may include prior impairment metric values preceding a current impairment metric value that satisfied the impairment threshold value and triggered the generation of the alert.

In one embodiment, the alert is a message configured to be displayed by a graphical user interface of the mobile device that includes the sensor. In one embodiment, the alert is configured to cause the mobile device to generate one or more of an audible output (e.g., a chime, beep, or other sound), a tactile output (e.g., a vibration), or a visual output (e.g., a flashing light or display of a symbol on the screen of the mobile device) in order to attract the attention of the individual. In one embodiment, the alert displayed by the mobile device may include a user-selectable element (such as a graphical user interface button) that initiates an emergency response to provide medical or other assistance to the individual. In one embodiment, generating the alert includes presenting or displaying the message with the mobile device.

In one embodiment, the alert is a message that is configured to be transmitted over a network, such as a cellular telephone network, wi-fi network, or other communications infrastructure. The message may be configured to be read by a computing device. For example, the alert may be configured to be processed by a computing device of an alert monitoring system configured to initiate responses to alerts of impairment. In one embodiment, generating the alert includes transmitting the message from the mobile device to an alert monitoring system. In one embodiment, the message is transmitted in order to initiate an emergency response. The alert monitoring system is configured to initiate an emergency response to the individual. The emergency response to the individual may include initiating communication with the individual, for example to inquire whether the individual needs help. The inquiry may be by text message or telephone communication to the mobile device. In one embodiment, the emergency response to the individual may include requesting dispatch of medical assistance personnel and/or equipment to the location of the individual.

In one embodiment, the message may be transmitted to equipment associated with the individual in order to prevent the individual from operating the equipment while in the impaired state. In response to receiving the message, the equipment may determine to stop operating until a message indicating that the impairment threshold is no longer satisfied by the impairment metric, indicating that the individual is no longer impaired. For example, an automobile associated with the individual may be rendered temporarily inoperable by receiving a message indicating that the individual is impaired in order to prevent the individual from operating the vehicle while impaired.

Thus, in one embodiment, in response to the impairment metric satisfying the threshold, gait monitoring method generates an alert that the being is impaired by composing a message indicating impairment of the individual and one or more of presenting the message to the individual, transmitting the message to initiate an emergency response, or transmitting the message to prevent operation of equipment. Process block 235 then completes, and gait monitoring method 200 continues to END block 240, where gait monitoring method 200 completes. In one embodiment, the functions of process block 235 are performed by alert generator 130.

At the conclusion of gait monitoring method 200, the gait of an individual has been analyzed to determine that the individual has become impaired, and an alert to relevant persons and/or systems has been generated. The individual may be informed of his or her impaired condition by display of an alert on the mobile device used to monitor the gait of the individual. Emergency responders may be informed of a potential medical emergency by receipt of an alert from the mobile device. Dangerous equipment may be locked or prevented from operation by the individual by receipt of an alert from the mobile device.

—Further Embodiments of Gait Monitoring Method—

In one embodiment, before generating residuals at process block 220 the measurements of the gait may be stretched (dilated) or shortened (compressed) to match a uniform pace of locomotion and aligned in phase with the reference pace. In one embodiment, before generating the time series of residuals at process block 220, gait monitoring method 200 further normalizes the measurements of the gait to a uniform pace by dilating or compressing the measurements of the gait in a moving window. Then, the lead and lag times of the measurements of the gait may be aligned to the uniform pace. Additional detail on normalizing measurements of gait to a uniform pace and alignment of lead and lag times is discussed below under the heading "Phase Synchronization."

In one embodiment, reference measurements of gait are taken from the individual while the individual is unimpaired, and used to select the set of frequency bins used in process block 215 and produce the time series of references used in process block 220. In one embodiment, before receiving the measurements of the gait of the human at process block 210, gait monitoring method 200 receives reference measurements of a second (reference) gait of the human walking while the human is unimpaired. Gait monitoring method 200 then identifies as the set of frequency bins a number of ranges of frequency in which the reference measurements show highest levels of vibration content. Gait monitoring method 200 then converts the reference measurements of the second (reference) gait into the time series of references for each range of the set. Additional detail on selection of the set of frequency bins is discussed below under the heading "Identifying Top Frequency Bins."

In one embodiment, the time series of references for each frequency bin represents a combination of multiple gaits of the individual locomoting at differing paces while unimpaired. Thus, in one embodiment, to produce the time series of references, gait monitoring method 200 receives reference measurements of a third (faster reference) gait of the human walking at a fast pace while the human is unimpaired. The fast pace of the third (faster reference) gait is faster than a pace of the second (reference) gait. Gait monitoring method 200 also receives reference measurements of a fourth (slower reference) gait of the human walking at a slow pace while the human is unimpaired. The slow pace of the fourth (slower reference) gait is slower than the pace of the second (reference) gait. Gait monitoring method 200 then normalizes the reference measurements of the second (reference) gait, third (faster reference) gait, and fourth (slower reference) gait to the uniform pace by dilating or compressing the reference measurements of each of the gaits in a moving window. Gait monitoring method 200 aligns the lead and lag times of the reference measurements of the second (reference) gait, third (faster reference) gait, and fourth (slower reference) gait to the uniform pace. Convert the reference measurements of the second gait into the time series of references for each range of the set (as discussed above) further includes generating an average of time series of references for each range of the set from the reference measurements of the second (reference) gait, third (faster reference) gait, and fourth (slower reference) gait.

Or, in one embodiment, the time series of references for each frequency bin represents a combination of at least two gaits of the individual locomoting at differing paces while unimpaired. Thus, in one embodiment, to produce the time series of references, gait monitoring method 200 receives reference measurements of a third gait while the being is unimpaired, where pace of locomotion differs for the second gait and the third gait. Gait monitoring method 200 then normalizes the reference measurements of the second gait and third gait to a uniform pace by dilating or compressing the reference measurements of each of the gaits in a moving window. Gait monitoring method 200 then aligns the lead and lag times of the reference measurements of the second gait and third gait to the uniform pace. Gait monitoring method 200 then generates an average of time series of references for each range of the set from the reference measurements of the second gait and third gait to convert the reference measurements of the second gait into the time series of references for each range of the set.

Again, additional detail on normalization to a uniform pace and alignment of lead and lag times is discussed below under the heading "Phase Synchronization." Additional detail on combining time series of signals of multiple paces of gait is discussed below under the heading "Combining Synchronized Series."

In one embodiment, the individual time series of observations are denoised by Fourier decomposition and reconstruction of the time series of observations from a top few component frequencies in terms of amplitude. In one embodiment, to denoise one or more of the time series of observations, gait monitoring method 200 transforms the one or more of the time series of observations into a frequency domain. Gait monitoring method 200 then selects a number of harmonics with greatest amplitude for the one or more of the time series of observations. Gait monitoring method 200 then transforms the selected harmonics to a time domain to reconstruct the one or more of the time series of observations with reduced noise. Additional detail on denoising of signals by Fourier Decomposition and reconstruction is discussed below under the heading "Denoising."

In one embodiment, as discussed above with reference to process block 225, the impairment metric is a cumulative mean absolute error for the time series of residuals. In one embodiment, to generate the impairment metric based on the time series of residuals, gait monitoring method 200 generates a mean absolute error of the time series of residuals for each range of the set. Then, gait monitoring method 200 sums the mean absolute errors of each time series of residuals to produce a cumulative mean absolute error, wherein the impairment metric is the cumulative mean absolute error.

In one embodiment, as discussed above with reference to process block 230, the threshold indicates a value of the impairment metric (such as cumulative mean absolute error for the time series of residuals) which is not ordinarily reached when the individual is unimpaired. Thus, in one embodiment, the individual is considered to be impaired when the measured gait of the human differs sufficiently from a reference gait to cause the impairment metric to satisfy the threshold.

In one embodiment, as discussed above with reference to process block 210, the sensor is an accelerometer carried by the individual. In one embodiment, the accelerometer is part of a mobile device. In one embodiment, a computing system is a mobile device incorporating a processor, accelerometer, and non-transitory computer-readable medium in a unit configured to be carried by an individual.

In one embodiment, as discussed above with reference to process block 235, alerts that the individual is impaired may be sent out to cause emergency services to attend to the impaired individual. In one embodiment, to generate an alert that the human is impaired, gait monitoring method 200 composes a message indicating that the human is impaired; and transmits the message in order to initiate an emergency response. In one embodiment, the message may include information about the suspected impairment, such as an indication of the onset of a stroke or an indication of intoxication, as well as GPS or other location information of the individual.

Overview

Mobile devices such as cellular phones now come with powerful and accurate embedded accelerometers—that is, vibration sensors—inside. These accelerometers may be used to detect motion related to gait of individuals (such as humans) during locomotion. In one embodiment, gait monitoring systems and methods provide for prognostic analysis of a gait of an individual. With prognostic analysis of gait, it becomes possible to detect impairment of the individual. In one embodiment, a gait monitoring system learns a "normal," nominal, or expected gait for an individual and detects the onset of impairment abnormalities in ongoing gait of the individual.

As discussed above, impairment of an individual could be caused for example by consciousness-altering substances, or from cognitive issues such as the early onset of strokes. In one embodiment, gait monitoring systems and methods may be used to detect: (1) impairment due to abuse of alcohol, cannabis, or other intoxicants, thereby substantially improving over reliance on ankle bracelets to prevent impaired operation of machinery; and (2) impairment due to onset of epileptic seizure, stroke, or other urgent health condition, thereby substantially improving upon emergency response to deliver aid.

The gait monitoring systems and methods described herein present a novel approach to characterizing, quantifying, and classifying motion of human gait. In one embodiment, a gait monitoring method characterizes multivariate operational frequency-domain signatures of a gait by autonomously extracting and ranking the most salient (that is, most information-bearing regarding the gait of an individual or most strongly associated with the gait of an individual) vibrational time-series signals from a database of measurements of the gait. These signals are then utilized to determine the nominal gait of the individual. A set of reference signals that represent nominal gait of the person may be referred to occasionally herein as a "gait fingerprint" of the individual. The gait fingerprint can then be compared to subsequent measurements to ascertain whether an individual is in an impaired state based on a novel impairment metric.

In one embodiment, accelerometer measurements may be used to characterize a nominal human gait. And, accelerometer measurements may be used to differentiate the nominal human gait from an impaired or otherwise altered gait. In one embodiment, the gait monitoring method quickly identifies the specific narrow frequencies that most closely reflect the energy content associated with a gait—for example, reflecting stride pattern and/or stride frequency—of an individual. In one embodiment, to determine the gait, an accelerometer is placed on, carried by, or otherwise borne by the individual and vibration measurements are recorded. Some narrow frequencies that are components of the vibration measurements are very strongly associated with the gait of the person (referred to as "salient" frequencies), whereas other narrow frequencies are just random noise.

In one embodiment, a double transformation from frequency-domain to time-domain to frequency-domain is performed to facilitate the identification of the pertinent frequencies. The double transformation includes a first transformation from the raw accelerometer readings in the time-domain to frequency-domain fine frequencies, for example by executing a fast Fourier transform of the raw accelerometer readings. The double transformation includes a second transformation from the fine frequencies resulting from the first transformation into a collection of individual time series in the time domain, for example by gathering the fine frequencies into bins or ranges and then generating new time series for the bins. In one embodiment, the individual time series are denoised by Fourier decomposition and reconstruction from a subset of signals. Subsequently, the frequency bins that are most salient are determined for selecting time series signals to make up the gait profile or gait fingerprint. In one embodiment, multiple paces of a gait are measured, transformed, denoised, phase-synchronized, and merged to generate the gait fingerprint. Because, in one embodiment, the gait fingerprint includes time series signals of changing amplitude values for multiple bins covering a frequency spectrum, the gait fingerprint may be referred to herein as a "three-dimensional (3D) gait dynamic fingerprint."

Once the gait fingerprint is established, it may be used to determine whether an individual is impaired or not. Determination of impairment may be accomplished by taking a second set of gait measurements for the individual and pre-processing them in a fashion similar to that described above for generating the gait fingerprint. Thus, the new measurements frequencies are binned, denoised and reconstructed, and phase normalized. But, because the most salient frequencies were determined previously when generating the gait fingerprint, those same most salient frequency bins that were selected for inclusion in the gait fingerprint are also used for monitoring any new measurements of gait.

Thus, in one embodiment, the frequencies selected for inclusion in the gait fingerprint are then monitored and compared to the original measurements by pointwise subtraction to generate a series of residuals. For example, where ten frequency bins were selected for inclusion in the gait fingerprint, the two sets of time series (for gait fingerprint and for current gait measurement) are then compared by conducting a point wise subtraction between the time series for corresponding frequency bins, producing ten sets of residuals. The Mean Absolute Error (MAE) is then calculated for each frequency. The MAE values are subsequently summed to distil the differences between the two signatures into an impairment metric. The impairment metric may be referred to herein as the Human Gait Dynamics Cumulative MAE (HGD CMAE). If the HGD CMAE breaches a threshold, then the current gait is indicated to be outside the normal range of gait thereby differentiating the nominal gait of a person and an impaired state. In one embodiment, the threshold is 12. In one embodiment, the threshold is configurable to other values by a user or administrator of gait monitoring system 100. Where the threshold is satisfied (e.g., met or exceeded) an alert indicating impairment may be generated.

Figure 6:
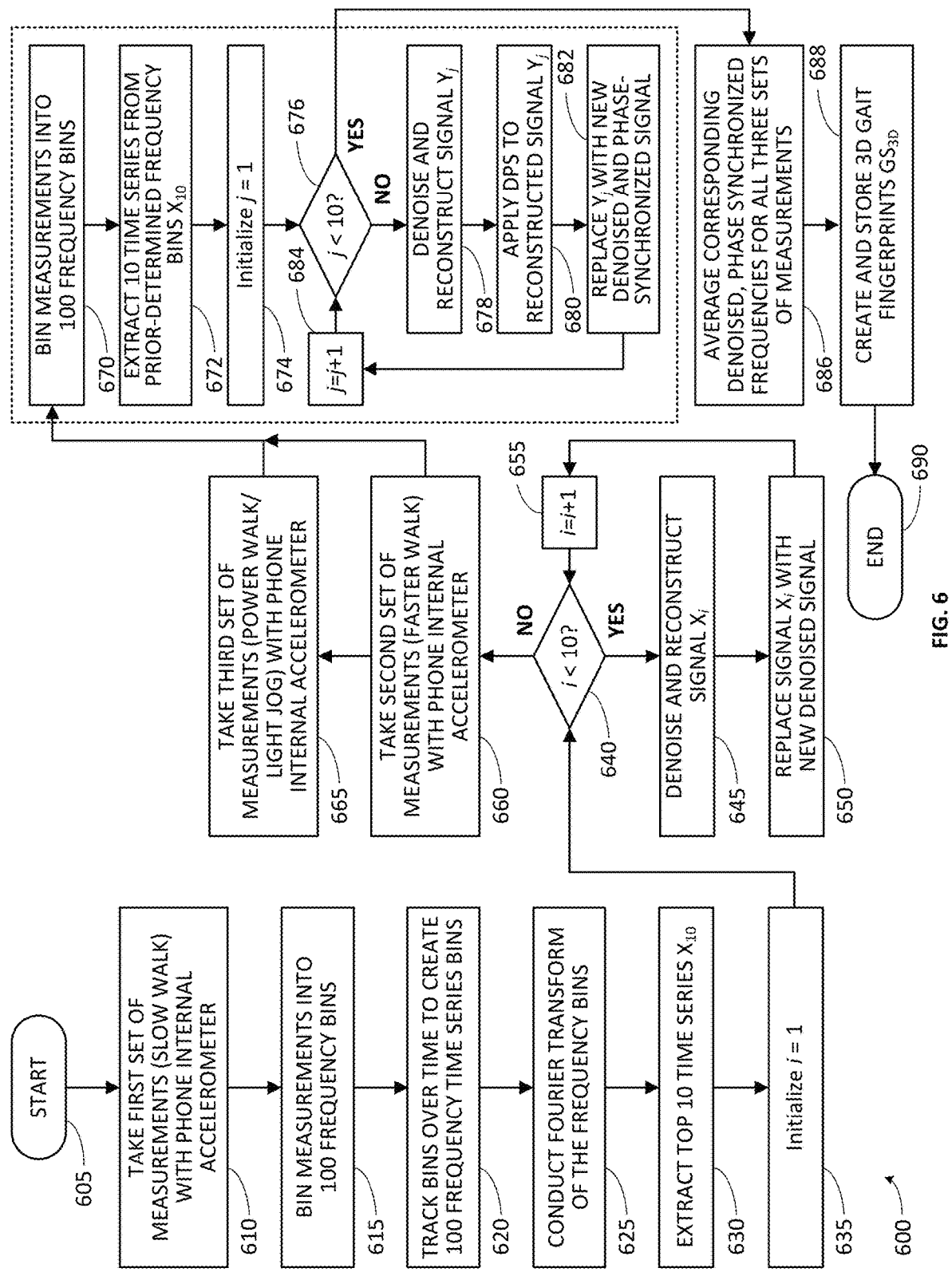
FIG. 6 illustrates one embodiment of a gait fingerprinting method associated with use of a vibration fingerprint for gait characterization and monitoring.

FIG. 6 illustrates one embodiment of a gait fingerprinting method 600 associated with use of a vibration fingerprint for gait characterization and monitoring. In one embodiment, gait fingerprinting method 600 initiates at START block 605 in response to a gait monitoring system determining that (i) a training or configuration session has been initiated; (ii) that an instruction to produce a gait fingerprint has been received; (iii) that a user or administrator of gait monitoring system 100 has initiated gait fingerprinting method 600; (iv) it is currently a time at which gait fingerprinting method 600; or (v) that gait fingerprinting method 600 should commence in response to occurrence of some other condition. In one embodiment, a computer configured by computer-executable instructions to execute functions of gait monitoring system 100 executes gait fingerprinting method 600. Following initiation at start block 605, gait fingerprinting method 600 continues to process block 610.

At process block 610, gait fingerprinting method 600 takes a first set of gait measurements for an individual performing a slow walk using an internal accelerometer of a phone (or other mobile device) borne by the individual (for example as shown and described above with reference to process block 210). At process block 615, the measurements are subdivided into 100 frequency bins (for example as described above with reference to process block 215). The 100 frequency bins cover a range of frequencies generated by the gait of the individual. At process block 620, the bins are tracked over time to create 100 frequency time series bins (for example as described with reference to reporting out values from a bin in process block 215). At process block 625, the gait fingerprinting method 600 conducts a Fourier transform of each of the 100 frequency-specific time series bins. At process block 630, the gait fingerprinting method 600 identifies and extracts the top 10 time series $X_{10}$ based on height of maximum power spectral density peak in a respective power spectral density curve resulting from the Fourier transforms (for example as described with respect to selecting the top frequency bins in process block 215 and further under the heading "Identifying Top Frequency Bins" below, and as described for reporting out the value at an interval in process block 215).

Process blocks 635-655 make up a denoising loop for denoising the extracted top 10 time series signals $X_{10}$. At process block 635, a counter i is initialized. At decision block 640, gait fingerprinting method 600 determines whether all of the top 10 time series signals $X_{10}$ have been denoised by determining if the value of the counter i remains under 10. If so, gait fingerprinting method 600 proceeds to process block 645. At process block 645, gait fingerprinting method 600 denoises and reconstructs the $i^{th}$ time series signal $X_i$ (for example as described below under the heading "Denoising"). At process block 650, the original time series signal $X_i$ is replaced with a denoised, reconstructed version of time series signal $X_i$, for example by overwriting time series signal $X_i$ with the denoised, reconstructed version. At process block 655, the counter i is incremented, and processing returns to decision block 640 to determine whether further time signals remain for denoising in further iterations of the denoising loop. When gait fingerprinting method 600 determines that all of the top 10 time series signals $X_{10}$ have been denoised by determining that the value of the counter i has reached 10, the denoising loop terminates, and processing proceeds to process block 660.

At process block 660, gait fingerprinting method 600 takes a second set of gait measurements for an individual performing a faster walk (that is, a walk that is faster than the first, slow walk) using the internal accelerometer of the phone borne by the individual. At process block 665, gait fingerprinting method 600 takes a third set of gait measurements for an individual performing a power walk or light jog (that is, a walk that is faster than the second, faster walk) using the internal accelerometer of the phone borne by the individual. (As with the measurement of the first slow walk, these further reference measurements for progressively faster gaits may also be performed, for example, as described above with reference to process block 210).

Process blocks 670-684 are repeated for both the second set of gait measurements and the third set of gait measurements. At process block 670, the second and third sets of gait measurements are also subdivided into the 100 frequency bins of process block 615. At process block 672, the gait fingerprinting method 600 extracts time series of observations from the prior-determined (at process block 630) top 10 frequency bins $X_{10}$ for both the second and third sets of gait measurements. The time series may be extracted for the second and third sets of gait measurements for example as described for reporting out the value at an interval in process block 215.

Process blocks 674-684 make up a denoising and phase normalization (synchronization) loop. At process block 674, a counter j is initialized. At decision block 676, gait fingerprinting method 600 determines whether all of the time series signals sampled for the second (or third) set of gait measurements from the prior-determined top 10 frequency bins $X_{10}$ have been denoised and phase normalized by determining if the value of the counter j remains under 10. If so, gait fingerprinting method 600 proceeds to process block 678. At process block 678, gait fingerprinting method 600 denoises and reconstructs the $j^{th}$ time series signal $Y_j$ from the second (or third) set of gait measurements (again, for example as described below under the heading "Denoising"). At process block 680, dynamic phase synchronization (DPS) is applied to the reconstructed time series signal $Y_j$ from the second (or third) set of gait measurements. DPS normalizes (or synchronizes) the phase of time series signal $Y_j$ to a uniform pace or cadence used by the top ten time series $X_{10}$. In one embodiment, the phase of time series signal $Y_j$ is normalized by selectively dilating or compressing the data points of signal Y to cause the data points of signal $Y_j$ to align in time with data points of the top ten time series $X_{10}$. (In one embodiment, the phase synchronization may be performed as described below under the heading "Phase Synchronization").

At process block 682, the original time series signal $Y_j$ is replaced with a denoised, reconstructed, and phase-synchronized version of time series signal $Y_j$, for example by overwriting time series signal $Y_j$ with the denoised, reconstructed and phase-synchronized version. At process block 684, the counter j is incremented, and processing returns to decision block 676 to determine whether further time series signals remain for denoising and phase-synchronizing in further iterations of the denoising and phase synchronization loop. When gait fingerprinting method 600 determines that all of the time series signals Y sampled for the second (or third) set of gait measurements have been denoised and phase synchronized by determining that the value of the counter j has reached 10, the denoising and phase synchronization loop terminates, and processing proceeds to process block 686.

At process block 686, the corresponding denoised, phase-synchronized frequencies for all three sets of measurements are averaged. That is, the values of their respective time series data points are averaged (for example as described below under the heading "Combining Synchronized Series"). These averaged time series signals are component time series signals of a reference gait fingerprint for the individual. At process block 688, gait fingerprinting method 600 creates and stores the reference 3D gait fingerprints $GS_{3D}$. For example, the gait fingerprinting method 600 combines the averaged time series signals for the first, second, and third gait measurements as component time series in a time series database of references. And, gait fingerprinting method 600 writes the time series database to memory or storage for subsequent retrieval and comparison with live measurements of gait for the individual. Upon the storage of the gait fingerprint, gait fingerprinting method 600 completes at END block 690.

In one embodiment, once the gait fingerprint for an individual has been established it can be used to determine the impairment state of the individual based on change in the gait of the individual. For subsequent analyses of the gait of an individual while the individual is in possession of her or his phone or other mobile device, the gait monitoring systems and methods may process the real-time output of the vibration accelerometer with similar processing steps to those used to establish the gait fingerprint. For example: divide into 100 frequency bins; pick the same frequency bins that were identified during the calibration testing with the individual; create time series corresponding to the top frequency bins using the most recent 120 seconds of data for all of the top frequency bins; perform phase normalization (for example, the DPS introduced herein) to shrink or expand portions of the waveform to align with the pace or cadence of the stored gait fingerprint for that subject; for all top frequency bins, subtract the new frequency time series for the top bins from the reference time series for the top bins stored as a gait fingerprint for the individual to create residual time series for respective top frequency bins; compute the mean absolute error (MAE) across all the residual time series; and compute a cumulative MAE, CMAE for the individual as an impairment metric for a current state of the individual. (Where a two-minute most recent window of time is used, a new CMAE impairment metric is produced every two minutes.

Figure 7:
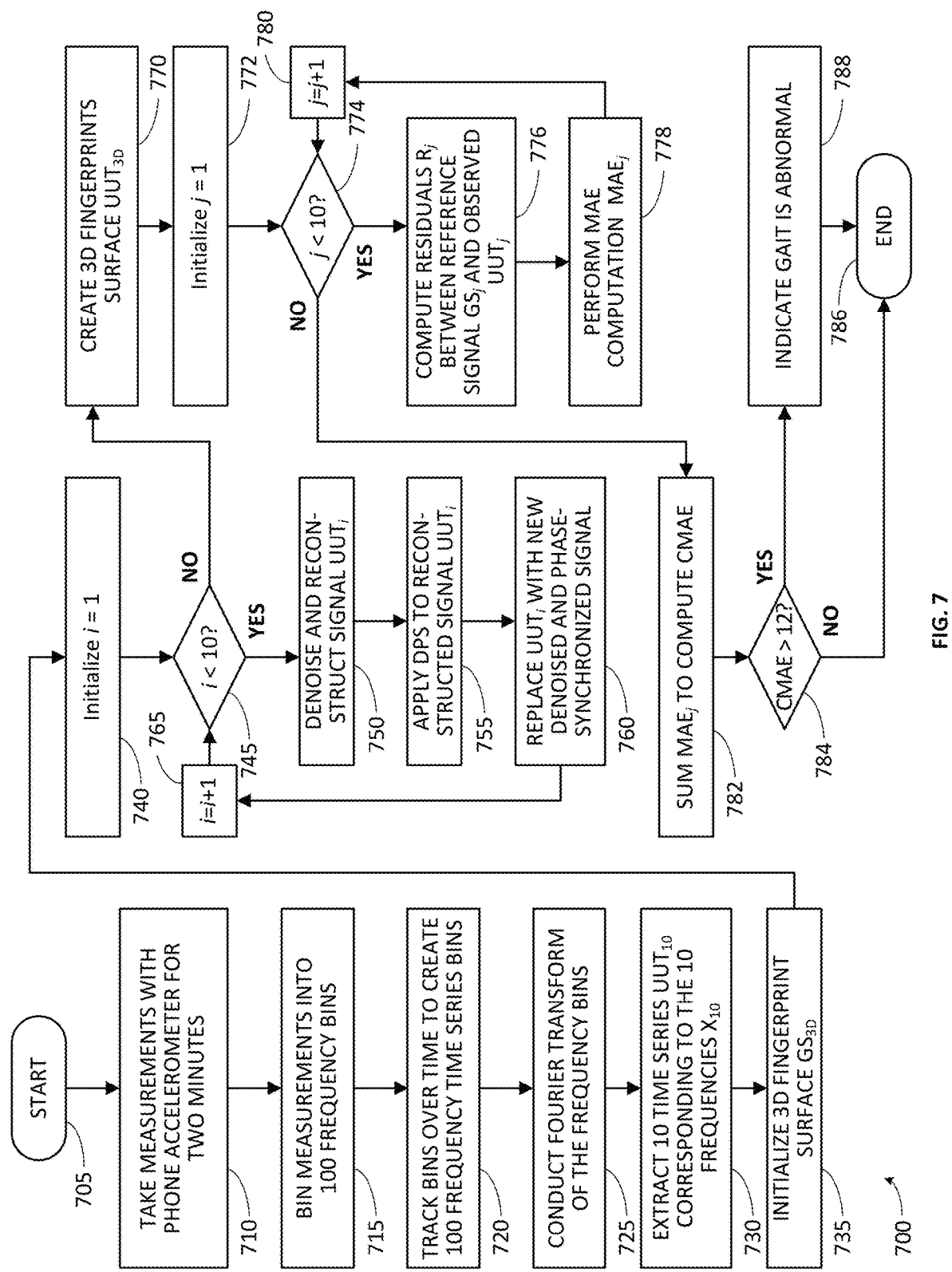
FIG. 7 illustrates one embodiment of a gait monitoring method associated with use of a vibration fingerprint for gait characterization and monitoring.

FIG. 7 illustrates one embodiment of a gait monitoring method 700 associated with use of a vibration fingerprint for gait characterization and monitoring. In one embodiment, gait monitoring method 700 initiates at START block 705 in response to occurrence of conditions such as those described above for gait monitoring method 200. In one embodiment, a computer configured by computer-executable instructions to execute functions of gait monitoring system 100 executes gait monitoring method 700. Following initiation at start block 705, gait monitoring method 700 continues to process block 710.

At process block 710, gait monitoring method 700 takes measurements of gait with a phone accelerometer for two minutes (for example as shown and described above with reference to process block 210). At process block 715, the measurements of gait are subdivided into 100 frequency bins (for example as described above with reference to process block 215). At process block 720, the bins are tracked over time to create 100 frequency time series bins (for example as described with reference to reporting out values from a bin in process block 215). At process block 725, a Fourier transform of each of the 100 frequency-specific time series bins is conducted. At process block 730, gait monitoring method 700 extracts 10 time series of observations $UUT_{10}$ that correspond to the prior-determined (at process block 630) 10 top frequencies $X_{10}$, for example by selecting those time series that are sampled from the 10 top frequencies to be the set of time series of observations $UUT_{10}$. At process block 735, gait monitoring method 700 initializes the reference 3D gait fingerprint $GS_{3D}$ (the set of time series of references), for example by retrieving it from storage or memory (for example as shown at input of time series of references 160 and described at process block 220).

Process blocks 740-765 make up a denoising and phase normalization (synchronization) loop. At process block 740, a counter i is initialized. At decision block 745, gait monitoring method 700 determines whether all of the ten time series of observations $UUT_{10}$ have been denoised and phase normalized by determining if the value of the counter i remains under 10. If so, gait monitoring method 700 proceeds to process block 750. At process block 750, gait monitoring method 700 denoises and reconstructs the $i^{th}$ time series signal $UUT_i$ (for example as described below under the heading "Denoising"). At process block 755, dynamic phase synchronization (DPS) is applied to the reconstructed time series signal $UUT_i$ to normalize (synchronize) the phase of time series signal $UUT_i$ to the uniform pace used by the top ten time series $X_{10}$. (for example as described below under the heading "Phase Synchronization"). At process block 760, the original time series signal $UUT_i$ is replaced with a denoised, reconstructed, and phase-synchronized version of time series signal $UUT_i$, for example by overwriting time series signal $UUT_i$ with the denoised, reconstructed and phase-synchronized version.

At process block 765, the counter i is incremented, and processing returns to decision block 745 to determine whether further time series signals remain in $UUT_{10}$ for denoising and phase-synchronizing. When gait monitoring method 700 determines that all of the time series signals $UUT_i$ have been denoised and phase synchronized by determining that the value of the counter j has reached 10, the denoising and phase synchronization loop terminates, and processing proceeds to process block 770. At process block 770, gait monitoring method 700 creates a 3D gait fingerprint surface $UUT_{3D}$ (that is, creates a current gait fingerprint or time series database of observations for the current measurements of gait of the individual).

Process blocks 772-780 make up a residual and MAE generation loop. At process block 772, a counter j is initialized. At decision block 774, gait monitoring method 700 determines whether all the time series of observations in the current gait fingerprint have compared to corresponding time series of references in the reference gait fingerprint by determining whether the value of the counter j remains under 10. If so, gait monitoring method 700 proceeds to process block 776. At process block 776, gait monitoring method 700 computes residuals $R_j$ between reference signal (time series of references) $GS_j$ and observed signal (time series of observations) $UUT_j$. For example, the residuals may be generated as described with reference to process block 220. At process block 778, gait monitoring method 700 performs a mean absolute error computation on residuals $R_j$ to find the mean absolute error $MAE_j$ between time series of references $GS_j$ and time series of observations $UUT_j$. Mean absolute error $MAE_j$ may be generated, for example, as described in process block 225. Mean absolute error $MAE_j$ is stored for subsequent processing to generate a cumulative mean absolute error as an impairment metric. At process block 780, the counter j is incremented, and processing returns to decision block 774 to determine whether residuals and an MAE have been generated for each time series of observations $UUT_j$. When gait monitoring method 700 determines that residuals and MAE have been generated for each time series of observations $UUT_j$, the residual and MAE generation loop terminates, and processing proceeds to process block 782.

At process block 782, gait monitoring method 700 sums the ten mean absolute errors $MAE_j$ to compute a cumulative mean absolute error (CMAE) (for example as shown and described with reference to process block 225). The CMAE may be used as an impairment metric. At decision block 784, gait monitoring method 700 compares the CMAE (impairment metric) to an impairment threshold (for example as described in process block 230). In this example, the impairment threshold of 12. Where the CMAE is not greater than 12, the impairment threshold is not satisfied (as described at process blocks 230-235), and gait monitoring method 700 proceeds to END block 786 and terminates. Where the CMAE is greater than 12, the impairment threshold is satisfied (as described at process blocks 230-235), and gait monitoring method 700 proceeds to process block 788. At process block 788, gait monitoring method 700 indicates that the gait of the individual is abnormal (for example by generating and displaying or transmitting an alert as described in process block 235). Upon indicating that the gait of the individual is abnormal, gait monitoring method 700 proceeds to END block 786 and terminates. In one embodiment, upon reaching END block 786, gait monitoring method returns to start block 705 to reiterate for an additional two minutes of gait measurements.

—Identifying Top Frequency Bins—

In one embodiment, the gait monitoring method 200 further includes an automatic framework to identify the top frequency bins that best characterize normal gait of an individual. For example, a configuration or training process is performed prior to gait monitoring method 200 to generate a set of time series of references for those top frequency bins that are most associated with the normal gait of the individual. At a high level, the gait monitoring method receives reference measurements of a normal gait of the individual locomoting while the individual is unimpaired, identifies a set of top frequency bins, a set of frequency bins in which the reference measurements are characterized by the most frequent vibration content, and converts the reference measurements of the normal gait into the time series of references for each frequency bin of the set.

In one embodiment, reference measurements of gait are taken from the individual while the individual is unimpaired, and used to select the set of frequency bins used in process block 215 and produce the time series of references used in process block 220. In one embodiment, the reference measurements are taken before receiving the measurements of the gait of the individual at process block 210. In one embodiment, the set of frequency bins is selected before converting the measurements of gait into time series of observations at process block 215. In one embodiment, the time series of references are produced before generating the time series of residuals at process block 220.

The reference measurements of the normal gait are obtained in a manner similar to that discussed above with reference to process block 210 for receiving measurements of a gait of an individual from a sensor. Additionally, the reference measurements are indicated to be representative of normal locomotion by the individual. In one embodiment, the reference measurements are indicated to represent normal locomotion by the individual by definition because they are obtained during the configuration or training process, in which the individual is presumed to be unimpaired.

Once the reference measurements of normal gait are obtained, the next step is to ascertain optimal or most salient reference frequency bins (that is, the top frequency bins that best characterize normal gait of an individual) to monitor. To accomplish the pertinent frequency identification, the behavior of the time series for each bin is examined further in the frequency domain. The time series produced for each of the bins covering the power spectrum of the measurements of gait are individually transformed again into the frequency domain, producing individual power spectra for each time series. The bins are then ranked by strongest frequency component of the bin's associated individual power spectrum, that is, ranked by maximum amplitude in the individual power spectrum. A number of top signals with the strongest frequency components (highest peaks) in the spectrogram. The top few frequency bins are selected based on the height of the peak in the frequency domain. These peaks correspond with gait frequency of the individual.

For example, 100 bins, containing the new time series, are each once more converted into the frequency domain and ranked by maximum period amplitude, and the 10 bins with the highest amplitudes are chosen. In one embodiment, selecting the top 10 out of 100 bins has been empirically demonstrated to adequately distinguish the complexities of gait motion. Residuals between time series of references from these 10 bins and time series of observations from these 10 bins are then used to generate an impairment metric (for example as described herein with reference to process block 225).

—Denoising—

There exist complications that can skew the impairment metric (HGD CMAE) values between measurements. One complication that can arise when comparing measurements is that the time series sampled from frequency bins can be noisy, obscuring the underlying patterns. The noise can be reduced through signal reconstruction.

In one embodiment, to reduce the noise, individual time series for frequency bins are decomposed through a technique called Fourier Decomposition, cleansed of all but a top few harmonics (also referred to as component frequencies), and reconstructed from the remaining top few harmonics to produce the denoised signal. The decomposition is conducted in the frequency domain through a fast Fourier transform (FFT) on the time series signal. The top N harmonics in the power spectral density for the signal are selected. To select the top N harmonics, frequencies for the N tallest peaks in the power spectral density curve are identified. Experimentation has shown that that N=3 works well to denoising a signal through reconstruction. After the selecting the top N (e.g., N=3) harmonic modes to be retained, an inverse FFT (iFFT) is employed to reconstruct the original time series, absent some high frequency noise components.

In one embodiment, this approach for denoising through reconstruction eliminates some high-frequency noisiness in the binned frequency time series. Advantageously, in one embodiment, this approach for denoising through reconstruction introduces no signal bias into the time series. Conventional smoothing techniques tend to bring both peaks and troughs closer to the mean, introducing some measure of bias to the high and low spots in the curves. In one embodiment, in addition to ensuring that minimal signal bias is introduced with this Fourier decomposition and iFFT reconstruction process, the residual function is minimized when differencing (that is, pointwise subtracting) a reference Gait Fingerprint from subsequent measured Gait Fingerprints. This yields much more distinct separation in the residuals for contrasting normal gait with impaired gait. In one embodiment, the Fourier decomposition and iFFT reconstruction process reduces instability of impairment metric (HGD CMAE) values between measurements and increases the certainty in the assertion of impairment.

Figure 8:
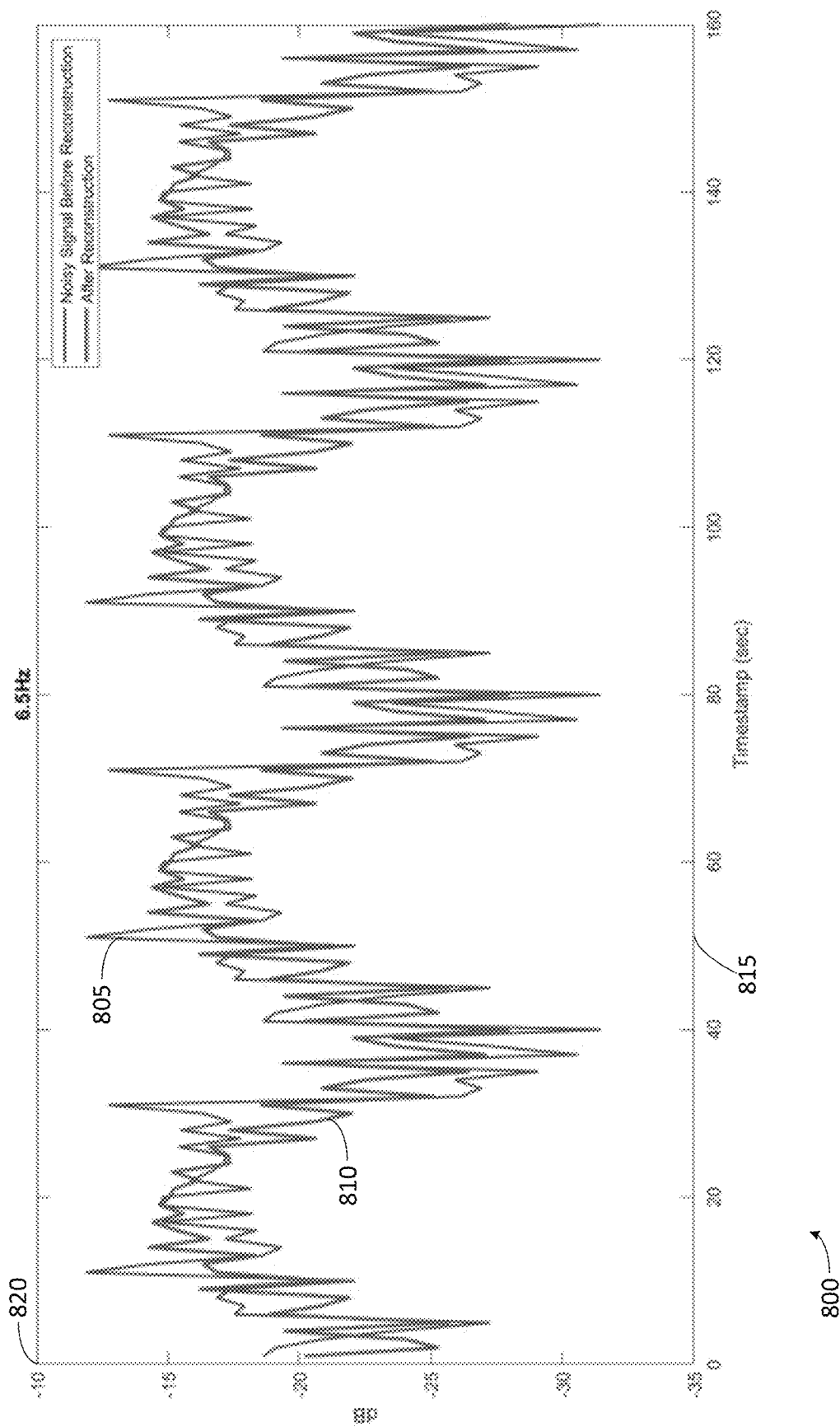
FIG. 8 shows a plot that illustrates relative noise level for an example time series sampled from an example frequency bin.
Figure 9:
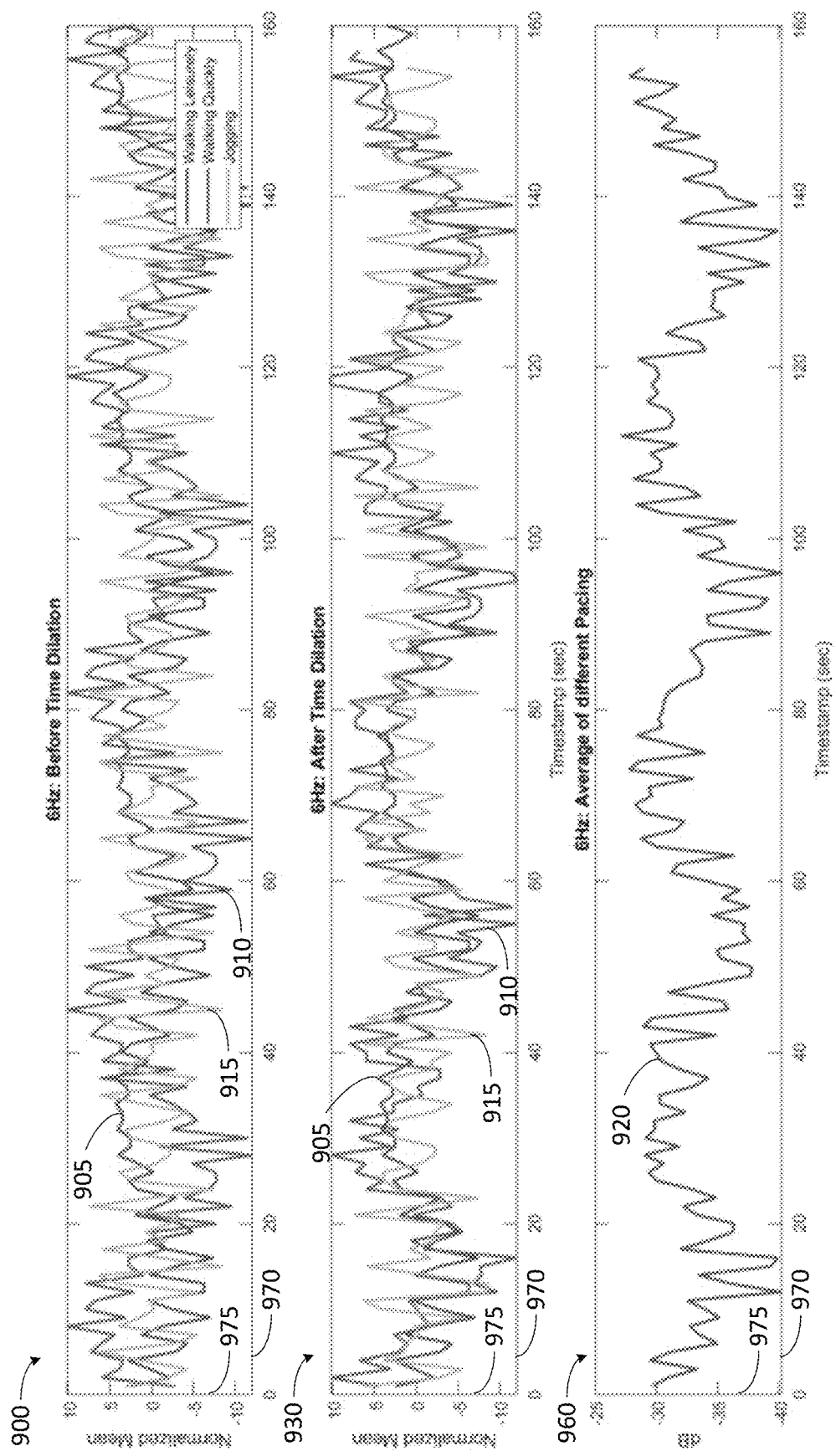
FIG. 9 shows time series sampled from a top frequency bin for a person walking slowly, the person walking swiftly, and the person jogging.

FIG. 8 shows a plot 800 that illustrates relative noise level for an example time series sampled from an example frequency bin at 6.5 Hz. A raw, non-denoised signal 805 and a denoised signal 810 are shown plotted against a time axis 815 and an amplitude axis 820. Non-denoised signal 805 shows the example time series to be a noisy signal before reconstruction. To reduce the noisiness of the raw, non-denoised signal 805, the signal reconstruction process discussed above is applied. A FFT is performed on the non-denoised signal 805. The top 3 harmonics are picked from the power spectral density for the non-denoised signal 805. After picking the top 3 harmonics (for the top harmonic modes to be retained), an inverse FFT (called an iFFT) is employed to reconstruct the original time series absent some high frequency noise components, producing denoised signal 810. Denoised signal 810 shows the reduction in noise in comparison with the non-denoised signal 805 following the signal reconstruction process for denoising.

—Phase Synchronization—

An additional complication that can skew the impairment metric (HGD CMAE) values between measurements is a consequence of person's propensity to walk at different paces. Measurements taken from a person walking at different speeds results in faster or slower periodic behavior inside the frequency bins causing time series to be out of phase. The phase of the time series can be corrected using a technique called dynamic phase synchronization (DPS) to normalize phases between human walking paces. This provides a uniform pace or cadence of locomotion in the time series.

In one embodiment, the measurements of the gait may be stretched (dilated) or shortened (compressed) to match a uniform pace of locomotion and aligned in phase with the reference pace before using the measurements of the gait to generate the time series of residuals at process block 220. The uniform pace of locomotion may be a pace or tempo of locomotion in common with the time series of references. As a repeating, periodic, or cyclic motion, the gait has a phase that indicates the fraction of the cycle of motion that has been completed. In one embodiment, the uniform pace has a uniform period and frequency. For example, the uniform pace is one walk cycle (of two steps, right and left) per second, or a period of one second. Other consistent periods and frequencies for the uniform pace may be set by a user or administrator of gait monitoring system 100. In one embodiment, alignment to the uniform pace moves the measurements of gait along a time dimension to cause the phase of measurements of the gait to be concurrent with the phase of the uniform pace, for example by adjusting lead and lag times of the measurements of gait.

Inconsistent or varying walking speeds causes the phase of the time series of observations and the time series of references (in the reference gait fingerprint) to go in and out of synchronization. Generating residuals from non-synchronized time series results in larger residuals, which in turn increases the occurrence of false alarms. A dynamic phase synchronization (DPS) method may be performed upstream of the residual calculations to correct for these phase shifts in real-time. In one embodiment, DPS compresses and dilate the time series data points in a moving window to continuously normalize the phase by a transformation factor and sequentially optimizes the associated lead or lag time between the signals of interest. After DPS is completed in all the moving time windows (over the length of the time series of observations), an adjusted version of the time series of observations has been generated from the previously variably-out-of-phase time series. The adjusted time series of observations is now synced with the time series of references (reference signal) throughout the time domain.

Once time series for measurements of gait at differing paces have been denoised and reconstructed the separate time series go through phase normalization (such as DPS) to minimize variability in the time series. FIG. 9 shows time series sampled from a top frequency bin (6 Hz) for a person walking slowly, the person walking swiftly, and the person jogging in three subplots: before the application of phase normalization in a subplot of unsynchronized time series 900, after the application of phase normalization in a subplot of synchronized time series 930, and the average of the signals after phase normalization in a subplot of an average of the synchronized time series 960. Each subplot displays time series signals plotted against a time axis 970 and an amplitude axis 975.

Subplot of unsynchronized time series 900 displays the time series signal for three separate paces—slow walk 905, swift walk 910, and jog 915—after denoising reconstruction for the frequency bin 6 Hz. Slow walk 905 is the slowest pace. Swift walk 910 is the first increase in walking speed. Jog 915 shows the pace further increased to a light jog. The slow walk 905, swift walk 910, and jog 915 signals are out of phase to varying degrees. The phase misalignment is especially apparent when comparing the peaks and troughs of slow walk 905 and swift walk 905 signals. Subplot of synchronized time series 930 illustrates the signals after phase normalization has been applied. The peaks and troughs of the slow walk 905, swift walk 910, and jog 915 signals are aligned more closely.

In one embodiment, synchronizing phase of time series signals provides additional improvement to stability of the impairment metric (HGD CMAE) values between measurements and increase the certainty in the assertion of impairment.

—Combining Synchronized Series—

In one embodiment, the time series of references for each frequency bin represents a combination of multiple gaits of the individual locomoting at differing paces while unimpaired. Reference measurements may be taken of the individual walking slowly, walking at a moderate pace, walking swiftly, jogging, or running, for example. Thus, in one embodiment, reference measurements of multiple gaits of the individual are taken while the individual is unimpaired. The reference measurements for the multiple gaits are stretched (dilated) or shortened (compressed) to have a uniform pace or cadence. The reference measurements for the multiple gaits are then synchronized or aligned as to phase for example by adjustment of lead and lag times for the gaits. The reference measurements of the multiple gaits are then averaged to produce the time series of references. This averaging combines reference measurements of various paces of the individual into one gait fingerprint.

Referring again to FIG. 9, once the time series for slow walk 905, swift walk 910, and jog 915 time series signals have been synchronized to a reference pace or cadence (for example using DPS), the slow walk 905, swift walk 910, and jog 915 time series signals are then averaged to produce average time series signal 920. Average time series signal 920 is a reference denoised time series signal for the frequency bin centered at 6 Hz. Subplot of an average of the synchronized time series 960 illustrates the average time series signal 920 of the slow walk 905, swift walk 910, and jog 915 signals once the phase normalization is complete. Average time series signal 920 is much more representative of the behavior of the time series in the 6 Hz frequency bin than any one measurement. It is average time series signal 920 that will ultimately be used as one of the signals for the Gait Fingerprint.

In one embodiment, the denoising, phase synchronization, and averaging steps are applied to the time series from all the top frequency bins (for example, the top 10 frequency bins) for the individual. The denoised, synchronized, and averaged time series for the top frequency bins collectively define the reference gait fingerprint for the individual. In one embodiment, the reference gait fingerprint for each individual is stored in a library (such as a database or other data structure of gait fingerprints.

In one embodiment, where measurements of gait are taken for multiple paces, for example, slow walk, swift walk, and jog, the top frequencies are determined based on the measurements of the slowest pace. For example, after the top frequencies are determined for the slow walk, binning and sorting is repeated for the remaining sets of measurements. But, because the slow walk has the longest periods and has the most measurements per cycle of the gait, it will be more indicative of the gait dynamics than the other measurements. Therefore, in one embodiment, finding the optimal frequencies is unnecessary for the faster walks and instead the optimal frequencies found during the slow walk are used for all three paces.

—Selected Advantages—

In one embodiment, the systems, methods, and other embodiments for gait monitoring described herein provide for accurate detection of the onset of cognitive impairment of beings that move about on foot. In one embodiment, the systems, methods, and other embodiments for gait monitoring described herein provide for the detection of human-health anomalies in individuals with ultra-low false-positives and false-negatives based on measurement of the divergence of the gait of the individual from an expected normal gait. In one embodiment, the detection of impairment may be made with as little as two minutes of monitoring.

The onset of cognitive impairment can be an indicator of intoxication of an individual due to alcohol, cannabis, or other consciousness altering substances, and in one embodiment, the individual may be prevented from operating dangerous machinery in response to the highly accurate detection of impairment provided by the systems, methods, and other embodiments for gait monitoring described herein. The onset of cognitive impairment can also be an indicator of the onset of a serious health problem, such as a stroke or seizure, and in one embodiment, emergency care may be early and rapidly dispatched in response to the rapid and accurate detection of impairment provided by the systems, methods, and other embodiments for gait monitoring described herein.

—Software Module Embodiments—

In general, software instructions are designed to be executed by one or more suitably programmed processors accessing memory. These software instructions may include, for example, computer-executable code and source code that may be compiled into computer-executable code. These software instructions may also include instructions written in an interpreted programming language, such as a scripting language.

Such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as program modules stored in a non-transitory computer readable medium. The program modules are configured with stored instructions that when executed by at least a processor cause the computing device to perform the corresponding function(s) as described herein.

In one embodiment, one or more of the components described herein may intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/Internet protocol (TCP/IP) or other computer networking protocol. In one embodiment, components may (i) generate or compose an electronic message or signal to issue a command or request to another component, (ii) transmit the message or signal to other components, and (iii) parse the content of an electronic message or signal received to identify commands or requests that the component can perform, and in response to identifying the command, the component will automatically perform the command or request.

—Computing Device Embodiment—

Figure 10:
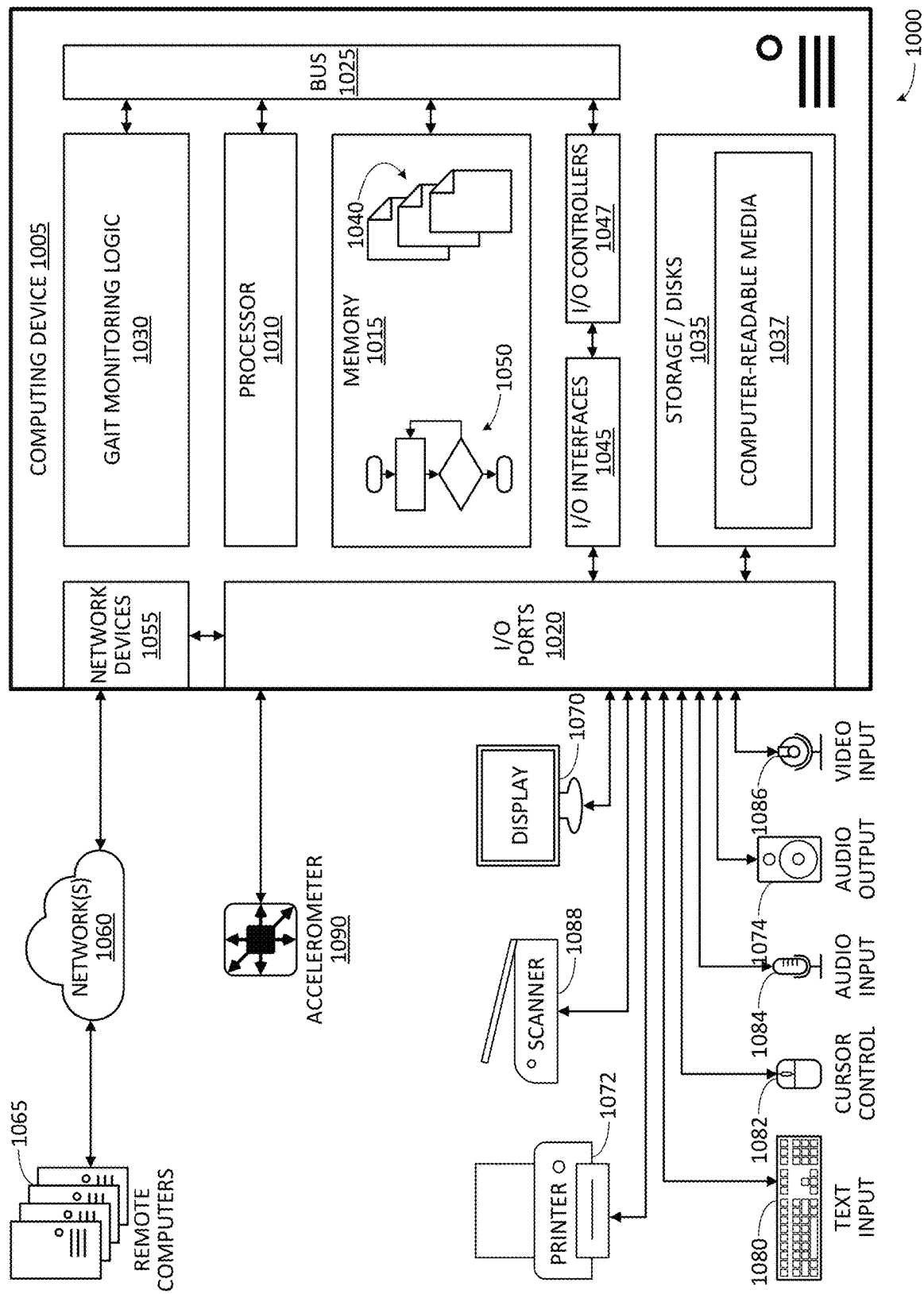
FIG. 10 illustrates an embodiment of a computing system configured with the example systems and/or methods described herein.

FIG. 10 illustrates an example computing system 1000 including an example computing device 1005 that is configured and/or programmed as a special purpose computing device with one or more of the example systems and methods described herein, and/or equivalents. The example computing device 1005 may be a computer that includes at least one hardware processor 1010, a memory 1015, and input/output ports 1020 operably connected by a bus 1025. In one example, the computing device 1005 may include gait monitoring logic 1030 configured to facilitate monitoring gait of an individual in order to detect impairment of the individual, similar to logic, systems, and methods shown and described with reference to FIGS. 1-9.

In different examples, the logic 1030 may be implemented in hardware, a non-transitory computer-readable medium 1037 with stored instructions, firmware, and/or combinations thereof. While the logic 1030 is illustrated as a hardware component attached to the bus 1025, it is to be appreciated that in other embodiments, the logic 1030 could be implemented in the processor 1010, stored in memory 1015, or stored in disk 1035.

In one embodiment, logic 1030 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to monitor gait of an individual in order to detect impairment of the individual. The means may also be implemented as stored computer executable instructions that are presented to computing device 1005 as data 1040 that are temporarily stored in memory 1015 and then executed by processor 1010.

Logic 1030 may also provide means (e.g., hardware, non-transitory computer-readable medium that stores executable instructions, firmware) for performing.

Generally describing an example configuration of the computing device 1005, the processor 1010 may be a variety of various processors including dual microprocessor and other multi-processor architectures. A memory 1015 may include volatile memory and/or non-volatile memory. Non-volatile memory may include, for example, ROM, PROM, and so on. Volatile memory may include, for example, RAM, SRAM, DRAM, and so on.

A storage disk 1035 may be operably connected to the computing device 1005 via, for example, an input/output (I/O) interface (e.g., card, device) 1045 and an input/output port 1020 that are controlled by at least an input/output (I/O) controller 1047. The disk 1035 may be, for example, a magnetic disk drive, a solid-state disk drive, a floppy disk drive, a tape drive, a Zip drive, a flash memory card, a memory stick, and so on. Furthermore, the disk 1035 may be a CD-ROM drive, a CD-R drive, a CD-RW drive, a DVD ROM, and so on. The memory 1015 can store a process 1050 and/or a data 1040, for example. The disk 1035 and/or the memory 1015 can store an operating system that controls and allocates resources of the computing device 1005.

The computing device 1005 may interact with, control, and/or be controlled by input/output (I/O) devices via the input/output (I/O) controller 1047, the I/O interfaces 1045, and the input/output ports 1020. The input/output ports 1020 may include, for example, serial ports, parallel ports, network ports, and USB ports. Input/output devices may include, for example, one or more displays 1070, printers 1072 (such as inkjet, laser, or 3D printers), audio output devices 1074 (such as speakers or headphones), text input devices 1080 (such as keyboards), cursor control devices 1082 for pointing and selection inputs (such as mice, trackballs, touch screens, joysticks, pointing sticks, electronic styluses, electronic pen tablets), audio input devices 1084 (such as microphones or external audio players), video input devices 1086 (such as video and still cameras, or external video players), image scanners 1088, video cards (not shown), disks 1035, network devices 1055, and so on. In one embodiment, the computing device 1005 is connected to and may interact with and receive input from one or more sensors that transduce physical phenomena into electronic signals, such as accelerometer 1090, through input/output (I/O) controller 1047, the I/O interfaces 1045, and the input/output ports 1020. In one embodiment, accelerometer is a solid-state, multi-axial accelerometer that may be borne by an individual. In one embodiment, accelerometer 1090 is affixed to a chassis of computing device 1005. In one embodiment, accelerometer 1090 may be remote from computing device 1005, and accelerometer 1090 may be connected to computing device 1005 by wired or wireless networks. In one embodiment, computer 1005 is configured with logic to collect readings from sensors such as accelerometer 1090 and store them as observations in a time series data structure such as a time series database.

The computing device 1005 can operate in a network environment and thus may be connected to the network devices 1055 via the I/O interfaces 1045, and/or the I/O ports 1020. Through the network devices 1055, the computing device 1005 may interact with a network 1060. Through the network, the computer 1005 may be logically connected to remote computers 1065. Networks with which the computer 1005 may interact include, but are not limited to, a LAN, a WAN, and other networks.

—Mobile Device Embodiment—

Figure 11:
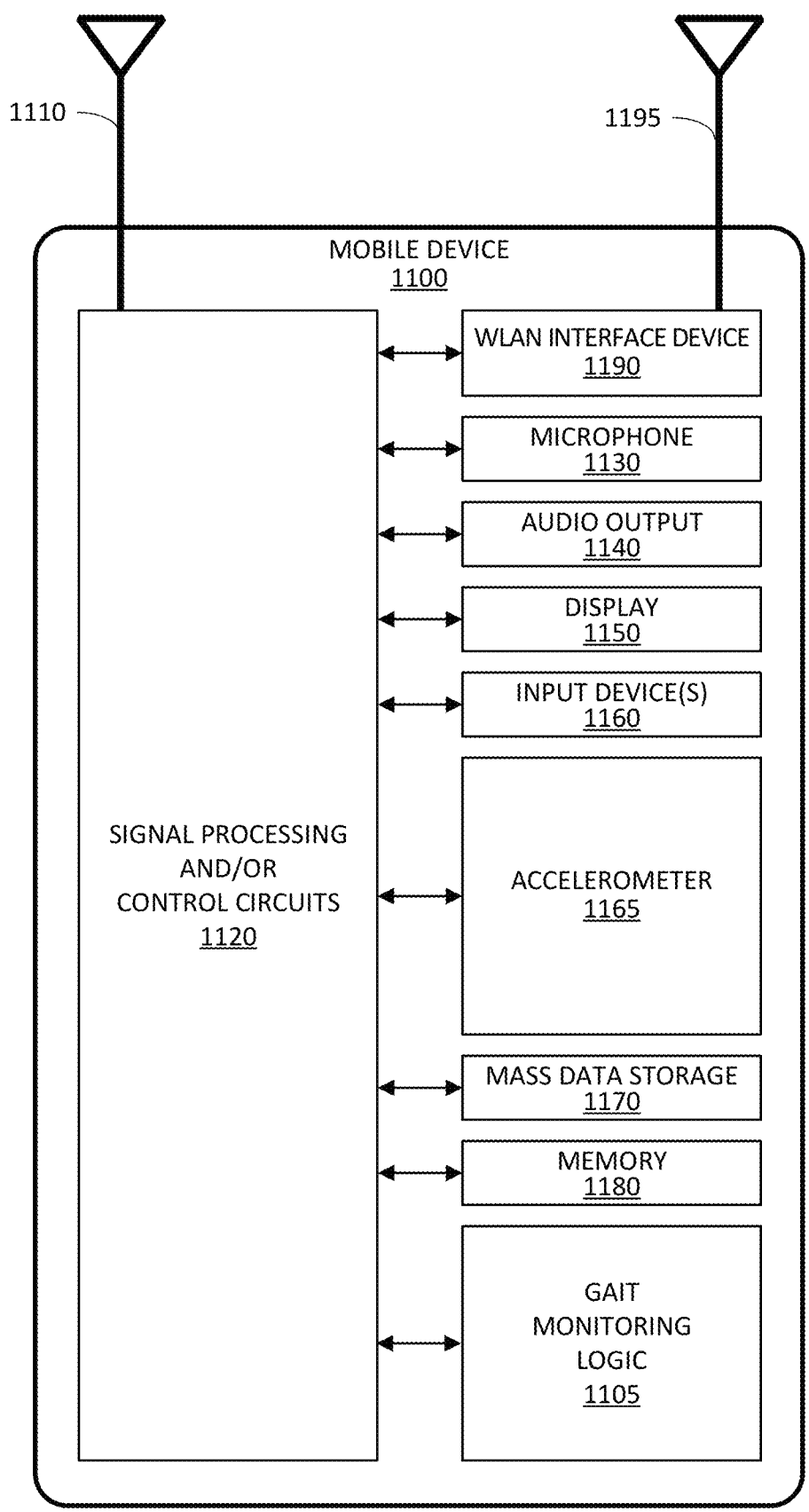
FIG. 11 illustrates an example mobile device that is configured with the example systems and/or methods described herein.

Referring now to FIG. 11, illustrates an example mobile device 1100 that is configured and/or programmed with one or more of the example systems and methods described herein, and/or equivalents. In one example, the mobile device 1100 may include gait monitoring logic 1105 configured to facilitate data-provider-agnostic change handling in mobile client applications similar to the logic, systems, and methods shown and described with reference to shown in FIGS. 1 through 10. Mobile device 1100 may include a cellular antenna 1110. The example embodiment may implement signal processing and/or control circuits, which are generally identified in FIG. 11 at 1120. In some implementations, the mobile device 1100 includes a microphone 1130, an audio output 1140 such as a speaker and/or audio output jack, a display 1150 and/or an input device 1160 such as a keypad, graphical keypad/keyboard, touch screen, pointing device, voice actuation and/or other input devices. In one embodiment, the mobile device 1100 includes a sensor such as accelerometer 1165 for sensing vibration or movement of the mobile device. The signal processing and/or control circuits 1120 and/or other circuits (not shown) in the mobile device 1100 may process data, perform coding and/or encryption, perform calculations, format data and/or perform other cellular phone, tablet, or mobile device functions.

The mobile device 1100 may communicate with a mass data storage 1170 that stores data in a nonvolatile manner such as in magnetic, optical, and/or solid-state storage devices including, for example, HDDs, DVD, and or SSDs. The cellular phone 1100 may be connected to a memory 1180 such as RAM, ROM, low latency nonvolatile memory such as flash memory and/or other suitable electronic data storage. The mobile device 1100 also may support connections with a WLAN by way of a WLAN network interface 1190. Mobile device 1100 may include a WLAN antenna 1195. In one embodiment, the mobile device 1100 may communicate through the WLAN with cloud storage systems that store data in a non-volatile manner. In one embodiment, example systems and methods may be implemented using the WLAN network interface 1190, but other arrangements are also possible.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the computer to:
   produce electronic accelerometer measurements of a gait of a human using an accelerometer borne by the human, wherein the gait of the human is monitored to detect impairment;
   convert the measurements of the gait into a time series of observations from each frequency bin in a set of frequency bins;
   generate a time series of residuals for each frequency bin of the set by pointwise subtraction between the time series of observations and a time series of references for each frequency bin of the set;
   generate an impairment metric based on the time series of residuals;
   compare the impairment metric to a threshold for the impairment; and
   in response to the impairment metric satisfying the threshold, transmit an electronic alert that the human is impaired.

2. The non-transitory computer-readable medium of claim 1, further comprising instructions that when executed by at least the processor cause the computer to, before generating the time series of residuals:
   normalize the measurements of the gait to a uniform pace by dilating or compressing the measurements of the gait in a moving window; and
   align lead and lag times of the measurements of the gait to the uniform pace.

3. The non-transitory computer-readable medium of claim 1, further comprising instructions that when executed by at least the processor cause the computer to, before producing the electronic accelerometer measurements of the gait of the human:
   receive reference measurements of a second gait of the human walking while the human is unimpaired;
   identify as the set of frequency bins a number of frequency bins in which the reference measurements show highest levels of vibration content; and
   convert the reference measurements of the second gait into the time series of references for each frequency bin of the set.

4. The non-transitory computer-readable medium of claim 3, further comprising instructions that when executed by at least the processor cause the computer to:
   receive reference measurements of a third gait of the human walking at a fast pace while the human is unimpaired, wherein the fast pace is faster than a pace of the second gait;
   receive reference measurements of a fourth gait of the human walking at a slow pace while the human is unimpaired, wherein the slow pace is slower than the pace of the second gait;
   normalize the reference measurements of the second gait, third gait, and fourth gait to a uniform pace by dilating or compressing the reference measurements of each of the gaits in a moving window;
   align lead and lag times of the reference measurements of the second gait, third gait, and fourth gait to the uniform pace; and
   wherein the instructions to convert the reference measurements of the second gait into the time series of references for each frequency bin of the set includes instructions to generate an average of time series of references for each frequency bin of the set from the reference measurements of the second gait, third gait, and fourth gait.

5. The non-transitory computer-readable medium of claim 1, further comprising instructions to denoise one or more of the time series of observations that when executed by at least the processor cause the computer to:
   transform the one or more of the time series of observations into a frequency domain;
   select a number of harmonics with greatest amplitude for the one or more of the time series of observations; and
   transform the selected number of harmonics to a time domain to reconstruct the one or more of the time series of observations with reduced noise.

6. The non-transitory computer-readable medium of claim 1, wherein the instructions to generate the impairment metric based on the time series of residuals further cause the computer to:
   generate a mean absolute error of the time series of residuals for each frequency bin of the set; and
   sum the mean absolute errors of each time series of residuals to produce a cumulative mean absolute error, wherein the impairment metric is the cumulative mean absolute error.

7. The non-transitory computer-readable medium of claim 1, wherein the human is considered to be impaired when the measurements of the gait of the human differs sufficiently from a reference gait to cause the impairment metric to satisfy the threshold.

8. The non-transitory computer-readable medium of claim 1, wherein the instructions to transmit an electronic alert that the human is impaired further cause the computer to transmit the electronic alert to an equipment associated with the human in order to render the equipment inoperable while the human is impaired.

9. A computer-implemented method, the method comprising:
    producing electronic accelerometer measurements of a gait of a being using an accelerometer borne by the being, wherein the gait of the being is monitored to detect impairment;
    converting the measurements of the gait into a time series of observations from each frequency bin in a set of frequency bins;
    generating a time series of residuals for each frequency bin of the set by pointwise subtraction between the time series of observations and a time series of references for each frequency bin of the set;
    generating an impairment metric based on the time series of residuals;
    comparing the impairment metric to a threshold for the impairment; and
    in response to the impairment metric satisfying the threshold, transmitting an electronic alert that the being is impaired.

10. The computer-implemented method of claim 9, further comprising, before generating the time series of residuals:
    normalizing the measurements of the gait to a uniform pace by dilating or compressing the measurements of the gait in a moving window; and
    aligning lead and lag times of the measurements of the gait to the uniform pace.

11. The computer-implemented method of claim 9, further comprising, before producing the electronic accelerometer measurements of the gait of the being:
    receiving reference measurements of a second gait of the being walking while the being is unimpaired;
    identifying as the set of frequency bins a number of ranges of frequency in which the reference measurements show highest levels of vibration content; and
    converting the reference measurements of the second gait into the time series of references for each frequency bin of the set.

12. The computer-implemented method of claim 11, further comprising:
    receiving reference measurements of a third gait while the being is unimpaired, where pace of locomotion differs for the second gait and the third gait;
    normalizing the reference measurements of the second gait and third gait to a uniform pace by dilating or compressing the reference measurements of each of the gaits in a moving window;
    aligning lead and lag times of the reference measurements of the second gait and third gait to the uniform pace; and
    generating an average of time series of references for each frequency bin of the set from the reference measurements of the second gait and third gait to convert the reference measurements of the second gait into the time series of references for each frequency bin of the set.

13. The computer-implemented method of claim 9, further comprising denoising one or more of the time series of observations by:
    transforming the one or more of the time series of observations into a frequency domain;
    selecting a number of harmonics with greatest amplitude for the one or more of the time series of observations; and
    transforming the selected number of harmonics to a time domain to reconstruct the one or more of the time series of observations with reduced noise.

14. The computer-implemented method of claim 9, wherein generating the impairment metric based on the time series of residuals further comprises:
    generating a mean absolute error of the time series of residuals for each frequency bin of the set; and
    summing the mean absolute errors of each time series of residuals to produce a cumulative mean absolute error, wherein the impairment metric is the cumulative mean absolute error.

15. A computing system, comprising:
    at least one processor;
    an accelerometer connected to the processor;
    a non-transitory computer-readable medium including instructions stored thereon that when executed by at least the processor cause the computing system to:
        produce electronic accelerometer measurements of a gait of a human from the accelerometer, wherein the accelerometer is borne by the human, wherein the gait of the human is monitored to detect impairment;
        convert the measurements of the gait into a time series of observations from each frequency bin in a set of frequency bins;
        generate a time series of residuals for each frequency bin of the set by pointwise subtraction between the time series of observations and a time series of references for each frequency bin of the set;
        generate an impairment metric based on the time series of residuals;
        compare the impairment metric to a threshold for the impairment; and
        in response to the impairment metric satisfying the threshold, transmit an electronic alert that the human is impaired.

16. The computing system of claim 15, wherein the non-transitory computer-readable medium further comprises instructions that when executed by at least the processor cause the computing system to, before generating the time series of residuals:
    normalize the measurements of the gait to a uniform pace by dilating or compressing the measurements of the gait in a moving window; and
    align lead and lag times of the measurements of the gait to the uniform pace.

17. The computing system of claim 15, wherein the non-transitory computer-readable medium further comprises instructions that when executed by at least the processor cause the computing system to:
    generate a mean absolute error of the time series of residuals for each frequency bin of the set; and
    sum the mean absolute errors of each time series of residuals to produce a cumulative mean absolute error, wherein the impairment metric is the cumulative mean absolute error.

18. The computing system of claim 15, wherein the instructions to transmit an electronic alert that the human is impaired further comprise instructions that when executed by at least the processor cause the computing system to:
compose a message indicating that the human is impaired; and
transmit the message in order to initiate an emergency response.

19. The computing system of claim 15, wherein the computing system is a mobile device incorporating the processor, the accelerometer, and the non-transitory computer-readable medium in a unit configured to be carried by the human.

20. The computing system of claim 15, wherein the set of frequency bins are selected based on an unimpaired gait.

* * * * *